(12) United States Patent
Huang

(10) Patent No.: US 11,249,283 B2
(45) Date of Patent: Feb. 15, 2022

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 459 days.

(21) Appl. No.: 16/402,742

(22) Filed: May 3, 2019

(65) Prior Publication Data

US 2019/0258031 A1 Aug. 22, 2019

Related U.S. Application Data

(63) Continuation of application No. 15/703,702, filed on Sep. 13, 2017, now Pat. No. 10,310,229.

(30) Foreign Application Priority Data

Mar. 28, 2017 (TW) ................................ 106110421

(51) Int. Cl.
*G02B 13/00* (2006.01)
*G02B 9/62* (2006.01)
*G02B 27/00* (2006.01)

(52) U.S. Cl.
CPC ............ *G02B 13/0045* (2013.01); *G02B 9/62* (2013.01); *G02B 13/005* (2013.01); *G02B 27/0025* (2013.01)

(58) Field of Classification Search
CPC .............. G02B 13/005; G02B 13/0045; G02B 27/0025; G02B 9/62
See application file for complete search history.

(56) References Cited

U.S. PATENT DOCUMENTS

| 2012/0268835 | A1 | 10/2012 | Huang |
| 2016/0161709 | A1 | 6/2016 | Hsueh et al. |
| 2016/0259150 | A1 | 9/2016 | Shin et al. |
| 2017/0045718 | A1 | 2/2017 | Park |
| 2017/0082833 | A1 | 3/2017 | Huang |
| 2017/0153420 | A1 | 6/2017 | Park |

FOREIGN PATENT DOCUMENTS

| CN | 104280859 A | 1/2015 |
| CN | 106772929 A | 5/2017 |

*Primary Examiner* — Jack Dinh
(74) *Attorney, Agent, or Firm* — Maschoff Brennan

(57) ABSTRACT

A photographing optical lens assembly includes six lens elements which are, in order from an object side to an image side: a first lens element, a second lens element, a third lens element, a fourth lens element, a fifth lens element and a sixth lens element. The second lens element has positive refractive power. The third lens element has negative refractive power. The sixth lens element with negative refractive power has an image-side surface being concave in a paraxial region thereof, wherein the image-side surface of the sixth lens element has at least one inflection point.

27 Claims, 23 Drawing Sheets

PHOTOGRAPHING OPTICAL LENS ASSEMBLY, IMAGE CAPTURING UNIT AND ELECTRONIC DEVICE

RELATED APPLICATIONS

This application is a continuation patent application of U.S. application Ser. No. 15/703,702, filed on Sep. 13, 2017, which claims priority to Taiwan Application 106110421, filed Mar. 28, 2017, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

In order to provide better user experience, electronic devices equipped with one or more optical systems have become mainstream products on the market. For various applications, the optical systems are developed with various optical features, and have been widely applied to different kinds of smart devices, such as vehicle devices, image recognition systems, entertainment devices, sport devices and intelligent home assistance systems, for various requirements.

However, a lens element in a conventional optical system usually has spherical lens surfaces, such that the size of the conventional optical system is difficult to be reduced. Furthermore, due to the difficulty of reducing the size of the conventional optical system, an electronic device equipped with the optical system would be large in size as well; therefore, the conventional optical system is inapplicable to a compact portable device. Accordingly, the conventional optical system is incapable of meeting the requirements of the current technology trends.

SUMMARY

According to one aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has negative refractive power. The sixth lens element with negative refractive power has an image-side surface being concave in a paraxial region thereof, wherein the image-side surface of the sixth lens element has at least one inflection point. When a focal length of the photographing optical lens assembly is f, a focal length of the first lens element is f1, a focal length of the fourth lens element is f4, a focal length of the fifth lens element is f5, a curvature radius of an image-side surface of the fourth lens element is R8, and a curvature radius of an image-side surface of the fifth lens element is R10, the following conditions are satisfied:

$$0 \le (f/R8)+(f/R10)<1.0;$$

$$|f/f4|+|f/f5|<0.80; \text{ and}$$

$$|f/f1|+|f/f4|<0.50.$$

According to another aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. The second lens element has positive refractive power. The sixth lens element has an image-side surface being concave in a paraxial region thereof, wherein the image-side surface of the sixth lens element has at least one inflection point. When a focal length of the photographing optical lens assembly is f, a curvature radius of an image-side surface of the fourth lens element is R8, a curvature radius of an object-side surface of the fifth lens element is R9, a curvature radius of an image-side surface of the fifth lens element is R10, a curvature radius of an object-side surface of the sixth lens element is R11, an Abbe number of the third lens element is V3, an Abbe number of the fourth lens element is V4, and an Abbe number of the fifth lens element is V5, the following conditions are satisfied:

$$-0.40<(f/R8)+(f/R10)<5.0;$$

$$20.0<V3+V4+V5<65.0; \text{ and}$$

$$-3.0<R11/R9<0.75.$$

According to still another aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has negative refractive power. The sixth lens element has an image-side surface being concave in a paraxial region thereof, wherein the image-side surface of the sixth lens element has at least one inflection point. When a focal length of the photographing optical lens assembly is f, a focal length of the first lens element is f1, a focal length of the second lens element is f2, a focal length of the third lens element is f3, a curvature radius of an image-side surface of the fourth lens element is R8, a curvature radius of an image-side surface of the fifth lens element is R10, an Abbe number of the third lens element is V3, an Abbe number of the fourth lens element is V4, and an Abbe number of the fifth lens element is V5, the following conditions are satisfied:

$$0 \le |f/R81+|f/R10|<0.50;$$

$$-0.20<(f/f2)-(f/f1)+(f/f3)<3.50; \text{ and}$$

$$15.0<V3+V4+V5<96.0.$$

According to yet another aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. The first lens element has positive refractive power. The second lens element with positive refractive power has an object-side surface being convex in a paraxial region thereof and an image-side surface being convex in a paraxial region thereof. The sixth lens element has an image-side surface being concave in a paraxial region thereof, wherein the image-side surface of the sixth lens element has at least one inflection point. When a focal length of the photographing optical lens assembly is f, a curvature radius of an object-side surface of the third lens element is R5, a curvature radius of an image-side surface of the third lens element is R6, a curvature radius of an image-side surface of the fourth lens element is R8, and a curvature radius of an image-side surface of the fifth lens element is R10, the following conditions are satisfied:

$0 \le f/R8;$ $0 \le f/R10;$ and $0 < (R5+R6)/(R5-R6).$

According to yet still another aspect of the present disclosure, an image capturing unit includes the aforementioned photographing optical lens assembly, a driving device and an image sensor, wherein the image sensor is disposed on an image surface of the photographing optical lens assembly.

According to yet still another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
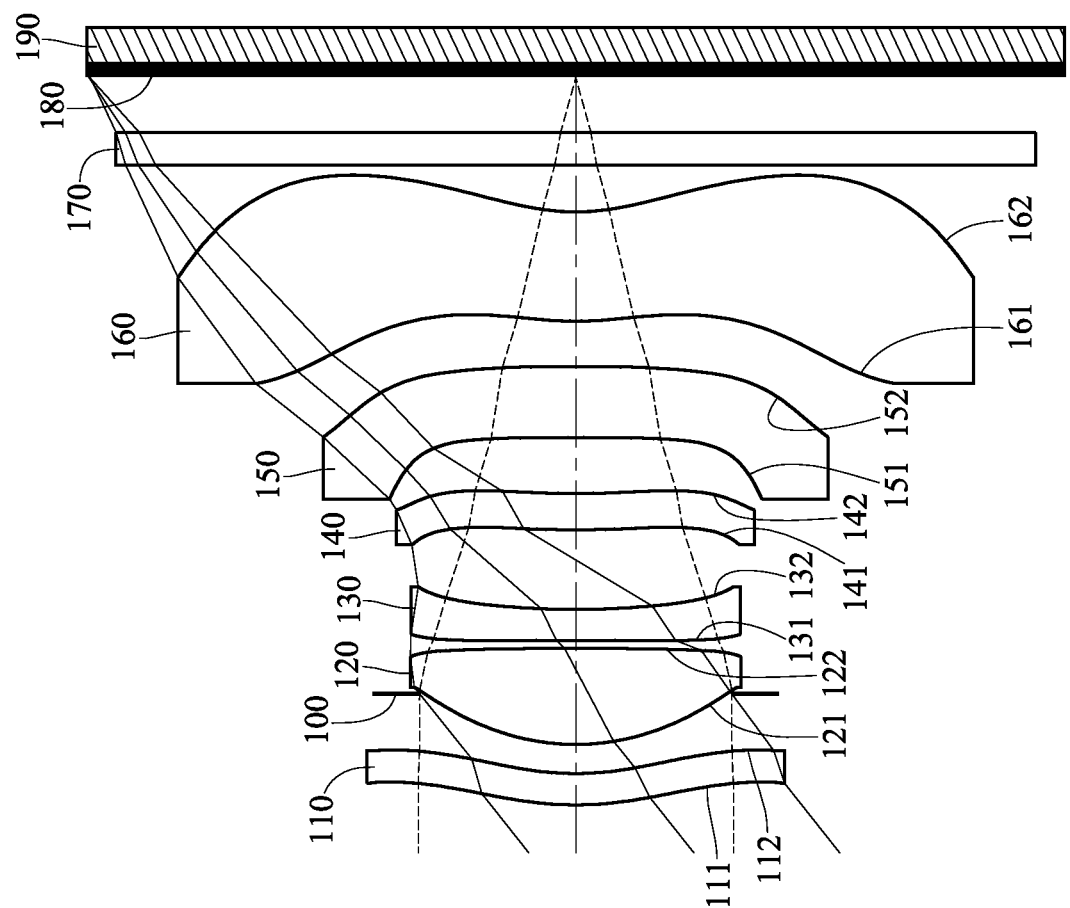
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element and a sixth lens element.

The first lens element can have positive refractive power; therefore, it is favorable for light converging together with the second lens element so as to lower the surface variation of the first and second lens elements, thereby reducing aberrations. The first lens element can have an object-side surface being convex in a paraxial region thereof and an image-side surface being concave in a paraxial region thereof; therefore, it is favorable for light converging in both sagittal and tangential directions so as to correct astigmatism.

The second lens element has positive refractive power; therefore, it is favorable for increasing the light convergence capability on the object side so as to reduce a total track length of the photographing optical lens assembly, thereby achieving compactness. The second lens element can have an object-side surface being convex in a paraxial region thereof; therefore, it is favorable for the second lens element to have sufficient light converging capability so as to reduce the total track length. The second lens element can have an image-side surface being convex in a paraxial region thereof; therefore, the image-side surface of the second lens element is favorable for being configured with the object-side surface of the second lens element for light convergence so as to prevent the curvature of each surface of the second lens element from being overly large to avoid stray light.

The third lens element can have negative refractive power; therefore, it is favorable for correcting chromatic aberration so as to prevent image overlaps due to light rays with different wavelengths focusing at different positions. The third lens element can have an image-side surface being concave in a paraxial region thereof; therefore, it is favorable for correcting aberrations generated by the second lens element so as to improve the image quality.

The fourth lens element has an object-side surface and an image-side surface, and the image-side surface of the fourth lens element can have at least one convex shape in an off-axial region thereof. Therefore, it is favorable for reducing distortion and preventing vignetting at the peripheral region of the image, and it is favorable for correcting aberrations in the off-axial region.

The fifth lens element has an object-side surface and an image-side surface, and the image-side surface of the fifth lens element can have at least one convex shape in an off-axial region thereof. Therefore, it is favorable for correcting aberrations in the off-axial region as well as preventing total reflection on the surfaces of the fifth lens element due to an overly large incident angle.

The sixth lens element can have negative refractive power; therefore, it is favorable for reducing a back focal length, such that the photographing optical lens assembly is able to be installed in compact devices. The sixth lens element can have an object-side surface being convex in a paraxial region thereof; therefore, it is favorable for controlling both the lens shape and the refractive power of the sixth lens element, balancing the curvatures of both surfaces of the sixth lens element to correct aberrations, and utilizing the photographing optical lens assembly in compact devices. The sixth lens element has an image-side surface being concave in a paraxial region thereof; therefore, a proper back focal length is favorable for keeping the photographing optical lens assembly compact. The image-side surface of the sixth lens element has at least one inflection point; therefore, it is favorable for correcting off-axial aberrations, minimizing the Petzval field curvature, and reducing the size of the photographing optical lens assembly while having high image quality.

When a focal length of the photographing optical lens assembly is f, a curvature radius of the image-side surface of the fourth lens element is R8, and a curvature radius of the image-side surface of the fifth lens element is R10, the following condition can be satisfied: $-0.40<(f/R8)+(f/R10)<5.0$. Therefore, the shapes of the image-side surface of the fourth lens element and the image-side surface of the fifth lens element are favorable for correcting aberrations to achieve high image quality. Preferably, the following condition can be satisfied: $-0.25<(f/R8)+(f/R10)<2.0$. More preferably, the following condition can be satisfied: $-0.15<(f/R8)+(f/R10)<1.0$. Much more preferably, the following condition can also be satisfied: $0 \leq (f/R8)+(f/R10)<1.0$.

When the focal length of the photographing optical lens assembly is f, a focal length of the fourth lens element is f4, and a focal length of the fifth lens element is f5, the following condition can be satisfied: $|f/f4|+|f/f5|<0.80$. Therefore, the refractive power on the image side of the photographing optical lens assembly is favorable for the fourth and fifth lens elements being configured as corrector lenses to correct off-axial aberrations. Preferably, the following condition can also be satisfied: $|f/f4|+|f/f5|<0.50$.

When the focal length of the photographing optical lens assembly is f, a focal length of the first lens element is f1, and the focal length of the fourth lens element is f4, the following condition can be satisfied: $|f/f1|+|f/f4|<0.50$. Therefore, it is favorable for correcting aberrations with a proper arrangement of the refractive power of the first lens element and fourth lens element so as to improve the image quality.

When an Abbe number of the third lens element is V3, an Abbe number of the fourth lens element is V4, and an Abbe number of the fifth lens element is V5, the following condition can be satisfied: $15.0<V3+V4+V5<96.0$. Therefore, the materials of the third, the fourth and the fifth lens elements are properly selected so as to increase a density difference between each lens element and air, thereby strengthening the refractive power of the lens elements; thus, the incident light is properly refracted within a shorter distance, and therefore it is favorable for reducing the total track length. Preferably, the following condition can also be satisfied: $20.0<V3+V4+V5<65.0$.

When a curvature radius of an object-side surface of the fifth lens element is R9, and a curvature radius of the object-side surface of the sixth lens element is R11, the following condition can be satisfied: $-3.0<R11/R9<0.75$. Therefore, the shapes of the fifth lens element and the sixth lens element are favorable for correcting aberrations. Preferably, the following condition can be satisfied: $-1.0<R11/R9<0.55$. More preferably, the following condition can also be satisfied: $-0.40<R11/R9<0.35$.

When the focal length of the photographing optical lens assembly is f, the curvature radius of the image-side surface of the fourth lens element is R8, and the curvature radius of the image-side surface of the fifth lens element is R10, the following condition can be satisfied: $0 \leq |f/R8|+|f/R10|<0.50$. Therefore, a proper arrangement of the curvatures of the image-side surface of the fourth lens element and the image-side surface of the fifth lens element is favorable for preventing total reflection due to an overly large incident angle on the surfaces of the lens element.

When the focal length of the photographing optical lens assembly is f, the focal length of the first lens element is f1, a focal length of the second lens element is f2, and a focal length of the third lens element is f3, the following condition can be satisfied: $-0.20<(f/f2)-(f/f1)+(f/f3)<3.50$. Therefore, the refractive power on the object side of the photographing optical lens assembly is favorable for providing sufficient field of view for various applications and keeping the photographing optical lens assembly compact so as to be disposed in various electronic devices. Preferably, the following condition can be satisfied: $0.10<(f/f2)-(f/f1)+(f/f3)<3.0$. More preferably, the following condition can also be satisfied: $0.90<(f/f2)-(f/f1)+(f/f3)<2.50$.

When the focal length of the photographing optical lens assembly is f, and the curvature radius of the image-side surface of the fourth lens element is R8, the following condition can be satisfied: $0 \leq f/R8$. Therefore, it is favorable for reducing the refractive power of the fourth lens element so as to prevent total reflection due to an overly large incident angle on the surfaces of the lens element, thereby reducing flare on the image. Preferably, the following condition can be satisfied: $0 \leq f/R8<1.0$. In addition, the following condition can also be satisfied: $-0.10<f/R8<1.0$.

When the focal length of the photographing optical lens assembly is f, and the curvature radius of the image-side surface of the fifth lens element is R10, the following condition can be satisfied: $0 \leq f/R10$. Therefore, it is favorable for reducing the refractive power of the fifth lens element and adjusting the back focal length to keep the photographing optical lens assembly compact. Preferably, the following condition can be satisfied: $0 \leq f/R10<0.75$. In addition, the following condition can also be satisfied: $-0.20<f/R10<0.80$.

When a curvature radius of an object-side surface of the third lens element is R5, and a curvature radius of the image-side surface of the third lens element is R6, the following condition can be satisfied: $0<(R5+R6)/(R5-R6)$. Therefore, the surface curvatures of the third lens element are favorable for correcting aberrations and obtaining a proper shape of the lens element, thereby improving the image quality. Preferably, the following condition can be satisfied: $0.80<(R5+R6)/(R5-R6)<3.40$. More preferably, the following condition can also be satisfied: $1.35<(R5+R6)/(R5-R6)<3.0$.

According to the present disclosure, the photographing optical lens assembly further includes an aperture stop which can be located between an imaged object and the object-side surface of the third lens element. When an axial distance between the aperture stop and the image-side surface of the sixth lens element is SD, and an axial distance between the object-side surface of the first lens element and the image-side surface of the sixth lens element is TD, the following condition can be satisfied: $0.73<SD/TD<1.10$. Therefore, it is favorable for positioning the aperture stop for balancing the field of view and the total track length, while keeping electronic devices compact with improved practicality.

When the focal length of the photographing optical lens assembly is f, and the focal length of the first lens element is f1, the following condition can be satisfied: $-0.30<f/f1<0.50$. Therefore, it is favorable for having improved capability of the first lens element in correcting axial aberrations. Preferably, the following condition can also be satisfied: $-0.30<f/f1<0.35$.

When a curvature radius of the image-side surface of the first lens element is R2, and a curvature radius of the image-side surface of the second lens element is R4, the following condition can be satisfied: $-1.20<(R2+R4)/(R2-R4)<-0.75$. Therefore, it is favorable for balancing the lens shape configuration between the image-side surface of the first lens element and the image-side surface of the second lens element while improving aberration corrections on the object side of the photographing optical lens assembly. Preferably, the following condition can also be satisfied: $-1.40<(R2+R4)/(R2-R4)<-0.65$.

According to the present disclosure, among the first through the sixth lens elements, each of at least three lens elements can have an Abbe number less than 25.0. Therefore, the lens elements can be made of high dispersion materials (low Abbe number) so as to obtain a large density difference between the lens elements and air; thus, the incident light is properly refracted within a shorter distance, and it is favorable for reducing the size of the photographing optical lens assembly.

When an axial distance between the third lens element and the fourth lens element is T34, an axial distance between the fourth lens element and the fifth lens element is T45, and a sum of central thicknesses of the six lens elements of the photographing optical lens assembly is ΣCT, the following condition can be satisfied: $0.29 \leq (T34+T45)/\Sigma CT<1.0$. Therefore, it is favorable for balancing space arrangement of lens elements with more efficient space utilization.

When the focal length of the photographing optical lens assembly is f, and an axial distance between the object-side surface of the first lens element and an image surface is TL, the following condition can be satisfied: $0.80<TL/f<1.30$. Therefore, it is favorable for balancing the field of view and the total track length, such that the photographing optical lens assembly stays compact with a wide field of view.

When the focal length of the photographing optical lens assembly is f, and a focal length of the sixth lens element is f6, the following condition can be satisfied: $-0.80<f/f6<0.20$. Therefore, the refractive power on the image side of the photographing optical lens assembly is favorable for correcting off-axial aberrations.

Figure 23:
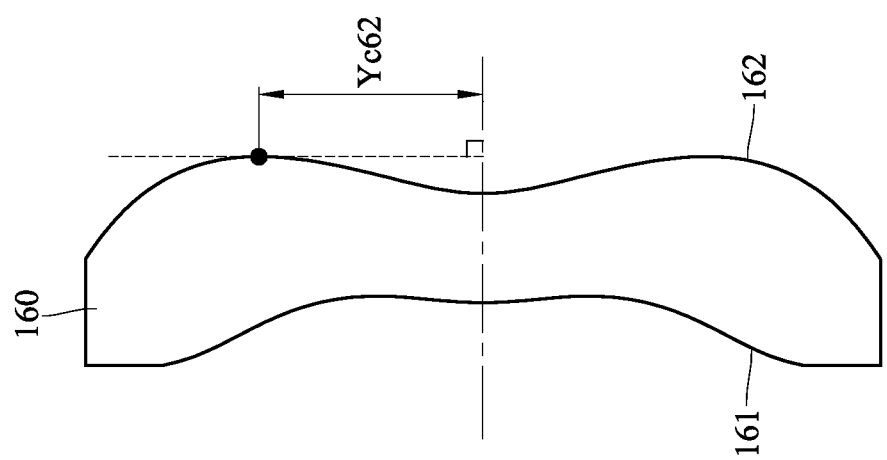
FIG. 23 shows a schematic view of Yc62 according to the 1st embodiment of the present disclosure.

When the focal length of the photographing optical lens assembly is f, and a vertical distance between a critical point on the image-side surface of the sixth lens element and an optical axis is Yc62, the following condition can be satisfied: $0.10<Yc62/f<1.0$. Therefore, it is favorable for adjusting the incident angle in the off-axial region and correcting off-axial aberrations; furthermore, it is favorable for obtaining sufficient image height and image capturing range. Please refer to FIG. 23, which shows a schematic view of Yc62 according to the 1st embodiment of the present disclosure.

When the axial distance between the object-side surface of the first lens element and the image surface is TL, a maximum image height (i.e., half of a diagonal length of an effective photosensitive area of an image sensor) of the photographing optical lens assembly is ImgH, the following condition can be satisfied: $TL/ImgH<2.0$. Therefore, it is favorable for keeping the photographing optical lens assembly compact; furthermore, it is favorable for the photographing optical lens assembly to gather light from large field of view so as to increase image brightness, thereby improving the image quality.

When half of a maximum field of view of the photographing optical lens assembly is HFOV, the following condition can be satisfied: $0.75<\tan(HFOV)<1.40$. Therefore, it is favorable for arranging a proper field of view so that the photographing optical lens assembly is widely applicable to different applications.

When an f-number of the photographing optical lens assembly is Fno, the following condition can be satisfied: $1.20<Fno<2.20$. Therefore, it is favorable for providing sufficient amount of incident light so as to improve image resolution.

When the Abbe number of the fourth lens element is V4, and a refractive index of the fourth lens element is N4, the following condition can be satisfied: $V4/N4<12.5$. Therefore, it is favorable for increasing a density difference between the fourth lens element and air so as to increase the capability of the fourth lens element for correcting aberrations.

When an axial distance between the first lens element and the second lens element is T12, and an axial distance between the second lens element and the third lens element is T23, the following condition can be satisfied: $2.60<T12/T23<7.50$. Therefore, a proper space arrangement of the photographing optical lens assembly is favorable for properly arranging the axial distances between the lens elements so as to correct aberrations.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an image surface of the photographing optical lens assembly, based on the corresponding image sensor, can be flat or curved, especially a curved surface being concave facing towards the object side of the photographing optical lens assembly. Furthermore, an image correction unit, such as a field flattener, can be optionally disposed between the lens elements of the photographing optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the demand of an image capturing unit. In general, a preferable image correction unit is, for example, a thin transparent element having a concave object-side surface and a planar image-side surface, and the thin transparent element is disposed near the image surface.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the photographing optical lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the photographing optical lens assembly and thereby provides a wider field of view for the same.

According to the above description of the present disclosure, the following specific embodiments are provided for further explanation.

1st Embodiment

Figure 2:
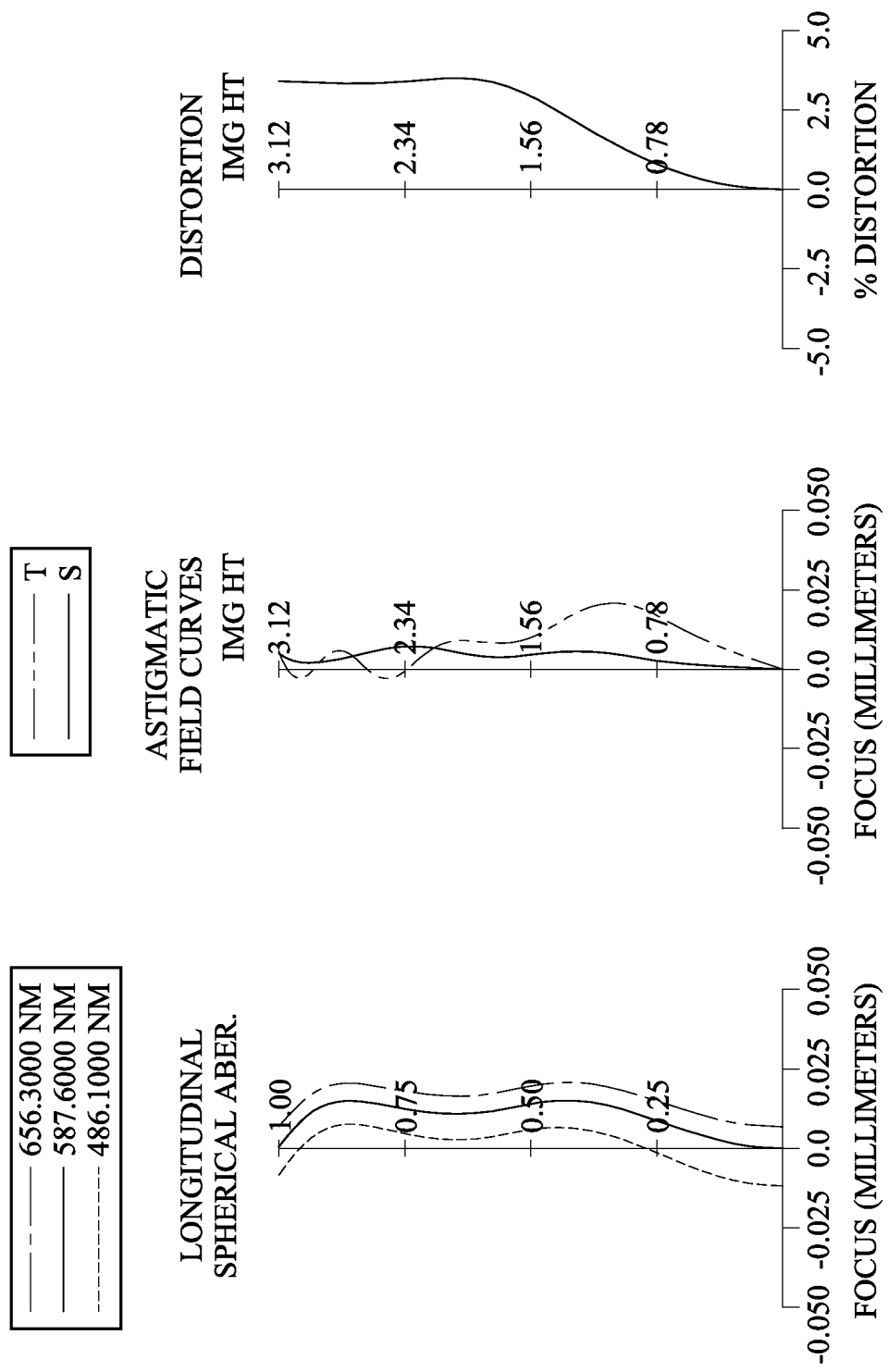
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, a first lens element 110, an aperture stop 100, a second lens element 120, a third lens element 130, a fourth lens element 140, a fifth lens element 150, a sixth lens element 160, a filter 170 and an image surface 180. The photographing optical lens assembly includes six lens elements (110, 120, 130, 140, 150 and 160) with no additional lens element disposed between the first lens element 110 and the sixth lens element 160.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has at least one convex shape in an off-axial region thereof.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one convex shape in an off-axial region thereof.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point.

The filter 170 is made of glass and located between the sixth lens element 160 and the image surface 180, and will not affect the focal length of the photographing optical lens assembly. The image sensor 190 is disposed on or near the image surface 180 of the photographing optical lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius; and k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=3.78 millimeters (mm), Fno=1.88, HFOV=38.5 degrees (deg.).

When an Abbe number of the fourth lens element 140 is V4, and a refractive index of the fourth lens element is N4, the following condition is satisfied: V4/N4=12.23.

When an Abbe number of the third lens element 130 is V3, the Abbe number of the fourth lens element 140 is V4, and an Abbe number of the fifth lens element 150 is V5, the following condition is satisfied: V3+V4+V5=60.9.

When an axial distance between the first lens element 110 and the second lens element 120 is T12, and an axial distance between the second lens element 120 and the third lens element 130 is T23, the following condition is satisfied: T12/T23=3.72. In this embodiment, the axial distance between two adjacent lens elements is the air gap in a paraxial region between the two adjacent lens elements.

When an axial distance between the third lens element 130 and the fourth lens element 140 is T34, an axial distance between the fourth lens element 140 and the fifth lens element 150 is T45, and a sum of central thickness of the six lens elements (110, 120, 130, 140, 150 and 160) of the photographing optical lens assembly is ΣCT, the following condition is satisfied: (T34+T45)/CT=0.36.

When a curvature radius of the image-side surface 112 of the first lens element 110 is R2, and a curvature radius of the image-side surface 122 of the second lens element 120 is R4, the following condition is satisfied: (R2+R4)/(R2−R4)=−1.04.

When a curvature radius of the object-side surface 131 of the third lens element 130 is R5, and a curvature radius of the image-side surface 132 of the third lens element 130 is R6, the following condition is satisfied: (R5+R6)/(R5−R6)=2.12.

When the focal length of the photographing optical lens assembly is f, and a curvature radius of the image-side surface 142 of the fourth lens element 140 is R8, the following condition is satisfied: f/R8=0.70.

When the focal length of the photographing optical lens assembly is f, and a curvature radius of the image-side surface 152 of the fifth lens element 150 is R10, the following condition is satisfied: f/R10=−0.02.

When a curvature radius of the object-side surface 151 of the fifth lens element 150 is R9, and a curvature radius of the object-side surface 161 of the sixth lens element 160 is R11, the following condition is satisfied: R11/R9=−0.05.

When the focal length of the photographing optical lens assembly is f, the curvature radius of the image-side surface 142 of the fourth lens element 140 is R8, and the curvature radius of the image-side surface 152 of the fifth lens element 150 is R10, the following condition is satisfied: (f/R8)+(f/R10)=0.68.

When the focal length of the photographing optical lens assembly is f, the curvature radius of the image-side surface 142 of the fourth lens element 140 is R8, and the curvature radius of the image-side surface 152 of the fifth lens element 150 is R10, the following condition is satisfied: |f/R8|+|f/R10|=0.73.

When the focal length of the photographing optical lens assembly is f, and a focal length of the first lens element 110 is f1, the following condition is satisfied: f/f1=−0.14.

When the focal length of the photographing optical lens assembly is f, and a focal length of the sixth lens element 160 is f6, the following condition is satisfied: f/f6=−0.40.

When the focal length of the photographing optical lens assembly is f, the focal length of the first lens element 110 is f1, and a focal length of the fourth lens element 140 is f4, the following condition is satisfied: |f/f1|+|f/f4|=0.16.

When the focal length of the photographing optical lens assembly is f, the focal length of the fourth lens element 140 is f4, and a focal length of the fifth lens element 150 is f5, the following condition is satisfied: |f/f4|+|f/f5|=0.06.

When the focal length of the photographing optical lens assembly is f, the focal length of the first lens element 110 is f1, a focal length of the second lens element 120 is f2, and a focal length of the third lens element 130 is f3, the following condition is satisfied: (f/f2)−(f/f1)+(f/f3)=1.21.

When an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.81.

When the focal length of the photographing optical lens assembly is f, and an axial distance between the object-side surface 111 of the first lens element 110 and the image surface 180 is TL, the following condition is satisfied: TL/f=1.23.

When the axial distance between the object-side surface 111 of the first lens element 110 and the image surface 180 is TL, and a maximum image height of the photographing optical lens assembly is ImgH, the following condition is satisfied: TL/ImgH=1.50.

When half of the maximum field of view of the photographing optical lens assembly is HFOV, the following condition is satisfied: tan(HFOV)=0.80.

When the focal length of the photographing optical lens assembly is f, a vertical distance between a critical point on the image-side surface 162 of the sixth lens element 160 and the optical axis is Yc62, the following condition is satisfied: Yc62/f=0.38.

The detailed optical data of the 1st embodiment are shown in Table 1 and the aspheric surface data are shown in Table 2 below.

TABLE 1

1st Embodiment
f = 3.78 mm, Fno = 1.88, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.084 | (ASP) | 0.200 | Plastic | 1.660 | 20.3 | −26.47 |
| 2 | | 1.791 | (ASP) | 0.510 | | | | |

TABLE 1-continued

1st Embodiment
f = 3.78 mm, Fno = 1.88, HFOV = 38.5 deg.

| Surface # | | Curvature Radius | | Thickness | Material | Index | Abbe # | Focal Length |
|---|---|---|---|---|---|---|---|---|
| 3 | Ape. Stop | Plano | | −0.324 | | | | |
| 4 | Lens 2 | 1.455 | (ASP) | 0.613 | Plastic | 1.544 | 55.9 | 2.71 |
| 5 | | 94.996 | (ASP) | 0.050 | | | | |
| 6 | Lens 3 | 13.730 | (ASP) | 0.200 | Plastic | 1.660 | 20.3 | −11.70 |
| 7 | | 4.915 | (ASP) | 0.508 | | | | |
| 8 | Lens 4 | 5.242 | (ASP) | 0.233 | Plastic | 1.660 | 20.3 | 188.55 |
| 9 | | 5.376 | (ASP) | 0.357 | | | | |
| 10 | Lens 5 | −43.170 | (ASP) | 0.453 | Plastic | 1.660 | 20.3 | −90.64 |
| 11 | | −155.578 | (ASP) | 0.291 | | | | |
| 12 | Lens 6 | 2.141 | (ASP) | 0.698 | Plastic | 1.534 | 55.9 | −9.54 |
| 13 | | 1.336 | (ASP) | 0.300 | | | | |
| 14 | Filter | Plano | | 0.210 | Glass | 1.517 | 64.2 | — |
| 15 | | Plano | | 0.361 | | | | |
| 16 | Image | Plano | | — | | | | |

Note:
Reference wavelength is 587.6 nm (d-line).

TABLE 2

Aspheric Coefficients

| Surface # | 1 | 2 | 4 | 5 | 6 | 7 |
|---|---|---|---|---|---|---|
| k = | −2.9719E+00 | −4.8397E+00 | −9.4822E−01 | −8.9985E+01 | −9.0000E+01 | −5.2358E+01 |
| A4 = | −7.9333E−02 | −7.3420E−02 | 4.6459E−04 | −9.4213E−02 | −1.5885E−01 | −1.8004E−02 |
| A6 = | −1.0355E−02 | −5.4323E−02 | −2.1315E−02 | 2.0325E−01 | 3.4448E−01 | 1.2518E−01 |
| A8 = | −6.3745E−03 | 5.4645E−02 | 1.1726E−01 | −3.3116E−01 | −4.4879E−01 | −8.7330E−02 |
| A10 = | 3.0981E−02 | 1.3789E−02 | −2.2165E−01 | 3.6416E−01 | 4.8834E−01 | 7.0683E−02 |
| A12 = | −1.9102E−02 | −3.2493E−02 | 2.2595E−01 | −2.2466E−01 | −3.3313E−01 | −6.2646E−02 |
| A14 = | 3.5459E−03 | 1.2068E−02 | −9.8579E−02 | 4.3511E−02 | 1.0224E−01 | 3.9516E−02 |
| A16 = | — | −1.2562E−03 | — | — | — | — |

| Surface# | 8 | 9 | 10 | 11 | 12 | 13 |
|---|---|---|---|---|---|---|
| k = | −7.6687E+01 | 2.0000E+01 | −5.0000E+01 | −1.0000E+00 | −1.8003E+01 | −6.3126E+00 |
| A4 = | −8.2194E−02 | −1.4356E−01 | −5.1049E−02 | −2.0088E−01 | −2.5902E−01 | −8.4289E−02 |
| A6 = | 5.1517E−02 | 3.2163E−02 | 9.8286E−03 | 4.2961E−01 | 2.0635E−01 | 3.5247E−02 |
| A8 = | −4.0894E−01 | −1.3553E−01 | 7.5016E−02 | −5.7488E−01 | −1.2060E−01 | −9.7627E−03 |
| A10 = | 1.0407E+00 | 1.7938E−01 | −5.2434E−01 | 4.3217E−01 | 4.3956E−02 | 1.0664E−03 |
| A12 = | −1.4644E+00 | −1.4575E−01 | 7.5954E−01 | −1.9502E−01 | −9.1216E−03 | 5.8947E−05 |
| A14 = | 1.0416E+00 | 4.7212E−02 | −5.0258E−01 | 4.8607E−02 | 9.9822E−04 | −2.3436E−05 |
| A16 = | −3.0347E−01 | — | 1.2315E−01 | −5.0325E−03 | −4.5149E−05 | 1.4618E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
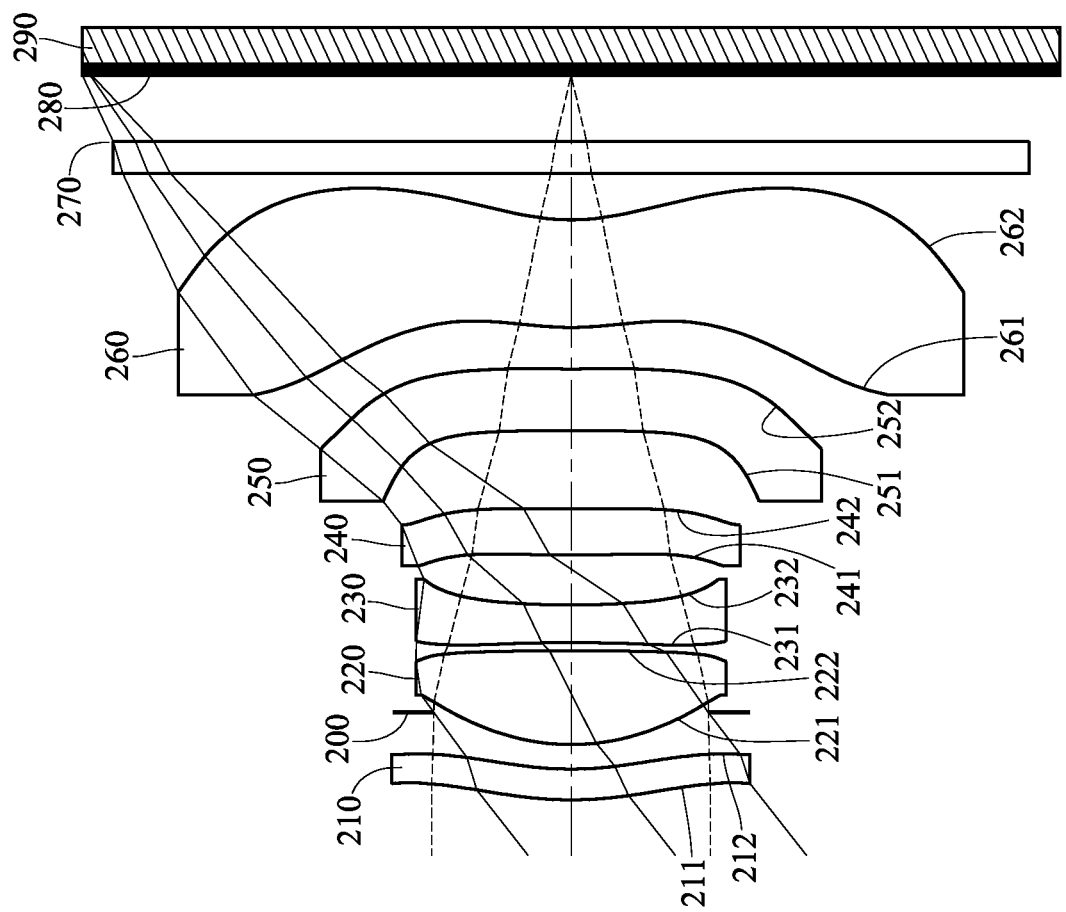
FIG. 3 is a schematic view of an image capturing unit according to the 2nd embodiment of the present disclosure.
Figure 4:
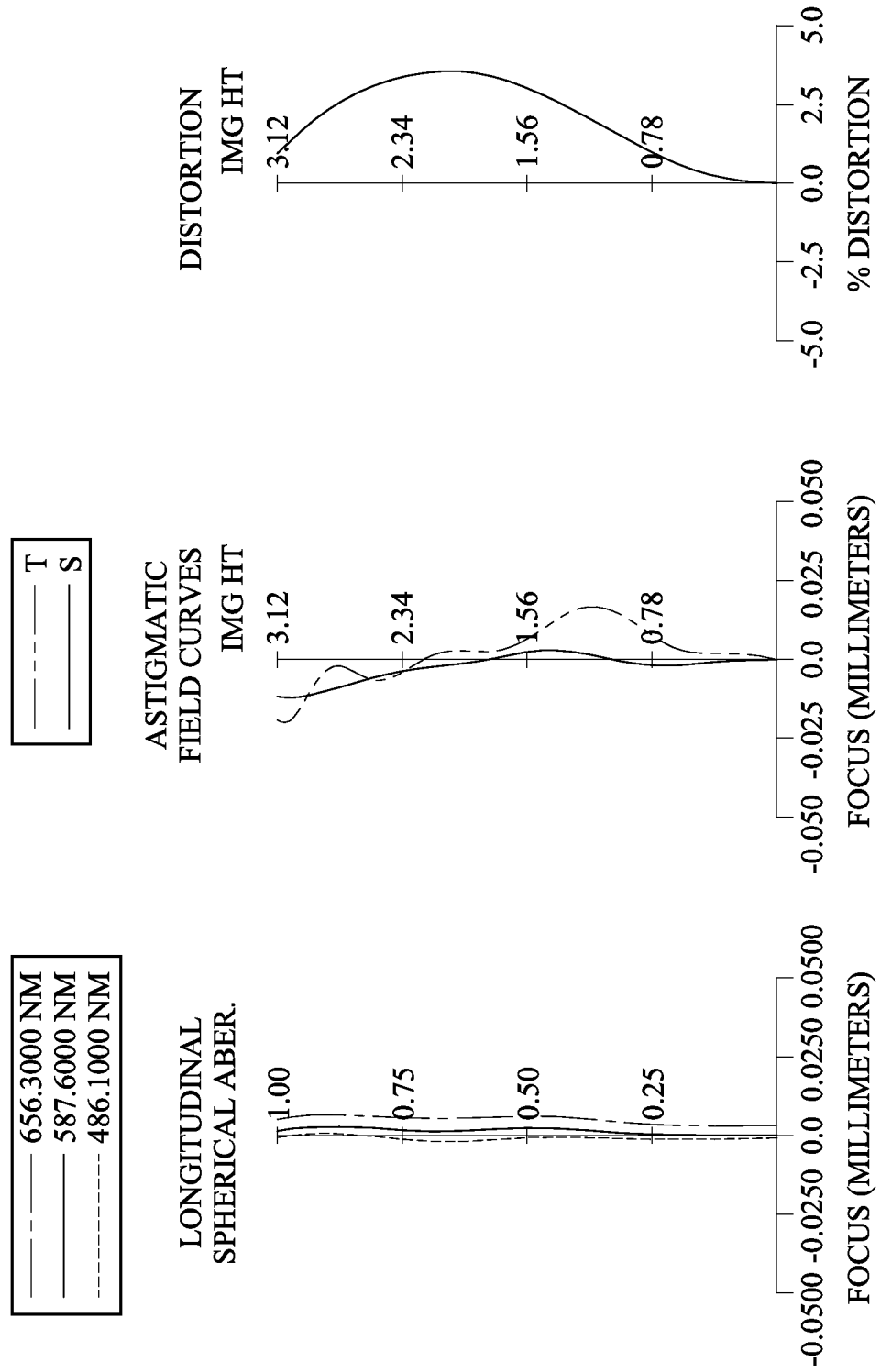
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, a first lens element 210, an aperture stop 200, a second lens element 220, a third lens element 230, a fourth lens element 240, a fifth lens element 250, a sixth lens element 260, a filter 270 and an image surface 280. The photographing optical lens assembly includes six lens elements (210, 220, 230, 240, 250 and 260) with no additional lens element disposed between the first lens element 210 and the sixth lens element 260.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one convex shape in an off-axial region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex shape in an off-axial region thereof.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one inflection point.

The filter 270 is made of glass and located between the sixth lens element 260 and the image surface 280, and will not affect the focal length of the photographing optical lens assembly. The image sensor 290 is disposed on or near the image surface 280 of the photographing optical lens assembly.

The detailed optical data of the 2nd embodiment are shown in Table 3 and the aspheric surface data are shown in Table 4 below.

TABLE 3

2nd Embodiment
f = 3.95 mm, Fno = 2.19, HFOV = 38.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 2.325 | (ASP) | 0.200 | Plastic | 1.660 | 20.3 | −50.21 |
| 2 |  | 2.098 | (ASP) | 0.369 |  |  |  |  |
| 3 | Ape. Stop | Plano |  | −0.210 |  |  |  |  |
| 4 | Lens 2 | 1.417 | (ASP) | 0.609 | Plastic | 1.544 | 55.9 | 2.52 |
| 5 |  | −35.275 | (ASP) | 0.052 |  |  |  |  |
| 6 | Lens 3 | −11.423 | (ASP) | 0.245 | Plastic | 1.660 | 20.3 | −6.09 |
| 7 |  | 6.251 | (ASP) | 0.324 |  |  |  |  |
| 8 | Lens 4 | 8.761 | (ASP) | 0.299 | Plastic | 1.660 | 20.3 | 24.32 |
| 9 |  | 19.016 | (ASP) | 0.507 |  |  |  |  |
| 10 | Lens 5 | −95.161 | (ASP) | 0.400 | Plastic | 1.660 | 20.3 | −15.21 |
| 11 |  | 11.249 | (ASP) | 0.270 |  |  |  |  |
| 12 | Lens 6 | 2.000 | (ASP) | 0.698 | Plastic | 1.534 | 55.9 | −14.08 |
| 13 |  | 1.388 | (ASP) | 0.300 |  |  |  |  |
| 14 | Filter | Plano |  | 0.210 | Glass | 1.517 | 64.2 | — |
| 15 |  | Plano |  | 0.427 |  |  |  |  |
| 16 | Image | Plano |  | — |  |  |  |  |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | −4.5070E+00 | −8.0706E+00 | −1.0795E+00 | −8.9985E+01 | −9.0000E+01 | −6.2575E+00 |
| A4 = | −7.3448E−02 | −8.2364E−02 | −1.3643E−02 | −2.2485E−02 | −1.3245E−02 | 2.5266E−02 |
| A6 = | −1.1558E−02 | −4.4127E−02 | 8.0637E−03 | 5.7222E−03 | 1.2514E−01 | 1.1164E−01 |
| A8 = | −9.8315E−03 | 5.6952E−02 | 8.7113E−02 | −4.6606E−01 | −4.3261E−01 | −1.4654E−01 |
| A10 = | 3.2691E−02 | 7.9889E−03 | −2.1449E−01 | 1.2404E+00 | 1.1455E+00 | 3.0604E−01 |
| A12 = | −1.7959E−02 | −3.4313E−02 | 2.6497E−01 | −1.3553E+00 | −1.2778E+00 | −3.2906E−01 |
| A14 = | 2.2320E−03 | 1.4608E−02 | −1.4693E−01 | 4.9183E−01 | 4.9971E−01 | 1.6911E−01 |
| A16 = | — | −2.1546E−03 | — | — | — | — |

| Surface # | 8 | 9 | 10 | 11 | 12 | 13 |
|---|---|---|---|---|---|---|
| k = | −7.6687E+01 | 1.5138E+01 | −5.0000E+01 | −1.0000E+00 | −1.5441E+01 | −6.2933E+00 |
| A4 = | −1.1475E−01 | −1.1179E−01 | −9.5241E−02 | −2.9345E−01 | −2.9703E−01 | −9.5931E−02 |
| A6 = | 5.3844E−02 | 3.5275E−02 | −3.5873E−03 | 4.8776E−01 | 1.9512E−01 | 3.8509E−02 |
| A8 = | −2.5616E−01 | −4.4155E−01 | 1.9864E−01 | −5.8848E−01 | −8.6705E−02 | −1.0432E−02 |
| A10 = | 5.3033E−01 | 2.1930E−01 | −6.6732E−01 | 4.3091E−01 | 2.5594E−02 | 1.3631E−03 |
| A12 = | −7.2075E−01 | −1.9552E−01 | 8.1070E−01 | −1.9456E−01 | −4.4986E−03 | −1.1748E−05 |
| A14 = | 5.0922E−01 | 8.2112E−02 | −4.8158E−01 | 4.8817E−02 | 4.2279E−04 | −1.6719E−05 |
| A16 = | −1.2446E−01 | — | 1.0995E−01 | −5.0876E−03 | −1.6477E−05 | 1.2591E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.95 | (f/R8) + (f/R10) | 0.56 |
| Fno | 2.19 | \|f/R8\| + \|f/R10\| | 0.56 |
| HFOV [deg.] | 38.0 | f/f1 | −0.08 |
| V4/N4 | 12.23 | f/f6 | −0.28 |
| V3 + V4 + V5 | 60.9 | \|f/f1\| + \|f/f4\| | 0.24 |
| T12/T23 | 3.06 | \|f/f4\| + \|f/f5\| | 0.42 |
| (T34 + T45)/ΣCT | 0.34 | (f/f2) − (f/f1) + (f/f3) | 1.00 |
| (R2 + R4)/(R2 − R4) | −0.89 | SD/TD | 0.85 |
| (R5 + R6)/(R5 − R6) | 0.29 | TL/f | 1.19 |
| f/R8 | 0.21 | TL/ImgH | 1.51 |
| f/R10 | 0.35 | tan (HFOV) | 0.78 |
| R11/R9 | −0.02 | Yc62/f | 0.34 |

3rd Embodiment

Figure 5:
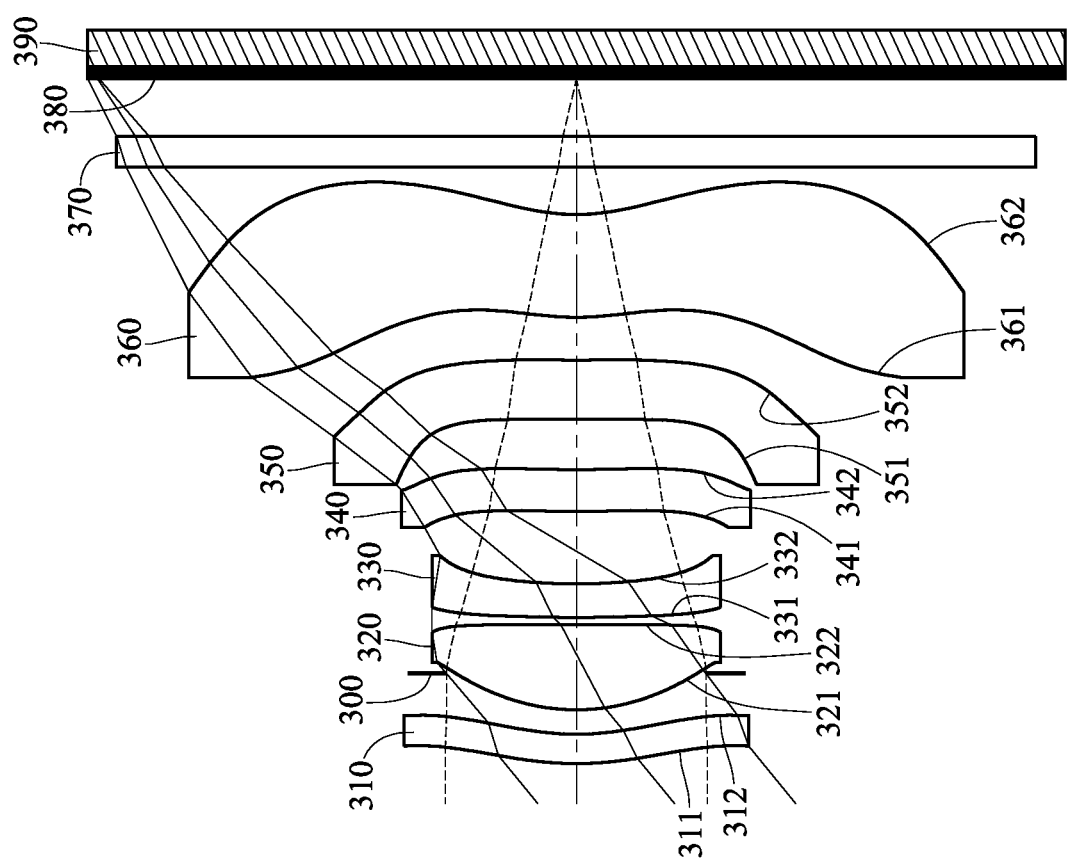
FIG. 5 is a schematic view of an image capturing unit according to the 3rd embodiment of the present disclosure.
Figure 6:
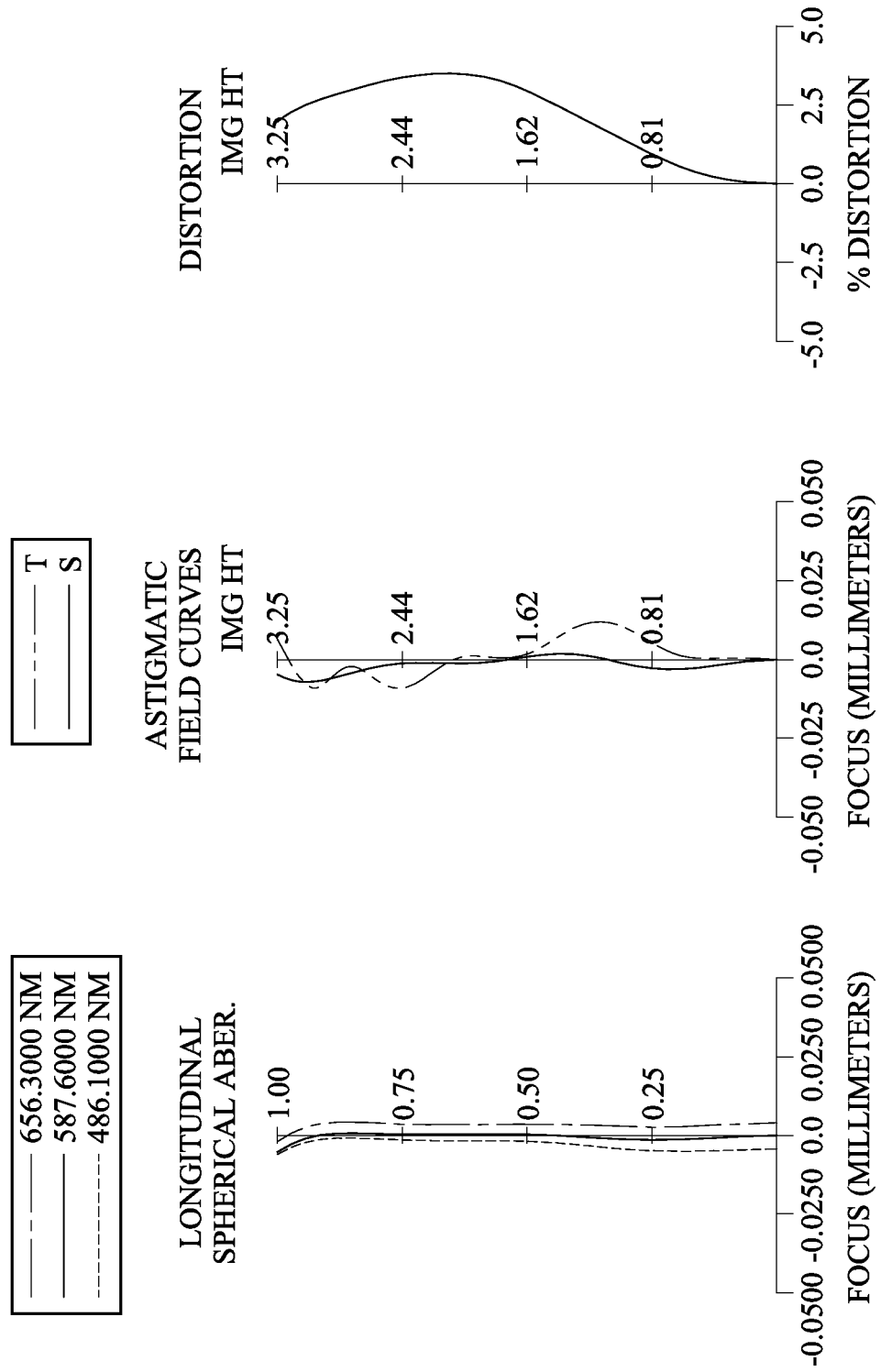
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, an aperture stop 300, a second lens element 320, a third lens element 330, a fourth lens element 340, a fifth lens element 350, a sixth lens element 360, a filter 370 and an image surface 380. The photographing optical lens assembly includes six lens elements (310, 320, 330, 340, 350 and 360) with no additional lens element disposed between the first lens element 310 and the sixth lens element 360.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The image-side surface 342 of the fourth lens element 340 has at least one convex shape in an off-axial region thereof.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex shape in an off-axial region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one inflection point.

The filter 370 is made of glass and located between the sixth lens element 360 and the image surface 380, and will not affect the focal length of the photographing optical lens assembly. The image sensor 390 is disposed on or near the image surface 380 of the photographing optical lens assembly.

The detailed optical data of the 3rd embodiment are shown in Table 5 and the aspheric surface data are shown in Table 6 below.

TABLE 5

3rd Embodiment
f = 3.90 mm, Fno = 2.19, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.181 | (ASP) | 0.200 | Plastic | 1.660 | 20.3 | −23.56 |
| 2 | | 1.843 | (ASP) | 0.411 | | | | |
| 3 | Ape. Stop | Plano | | −0.246 | | | | |
| 4 | Lens 2 | 1.374 | (ASP) | 0.579 | Plastic | 1.544 | 55.9 | 2.60 |
| 5 | | 39.988 | (ASP) | 0.050 | | | | |
| 6 | Lens 3 | 9.410 | (ASP) | 0.227 | Plastic | 1.660 | 20.3 | −10.51 |
| 7 | | 3.956 | (ASP) | 0.494 | | | | |
| 8 | Lens 4 | 11.556 | (ASP) | 0.283 | Plastic | 1.660 | 20.3 | −60.15 |
| 9 | | 8.864 | (ASP) | 0.341 | | | | |
| 10 | Lens 5 | 30.724 | (ASP) | 0.402 | Plastic | 1.660 | 20.3 | −28.25 |

TABLE 5-continued

3rd Embodiment
f = 3.90 mm, Fno = 2.19, HFOV = 39.3 deg.

| Surface # | | Curvature Radius | | Thickness | Material | Index | Abbe # | Focal Length |
|---|---|---|---|---|---|---|---|---|
| 11 | | 11.547 | (ASP) | 0.292 | | | | |
| 12 | Lens 6 | 1.884 | (ASP) | 0.698 | Plastic | 1.534 | 55.9 | −15.59 |
| 13 | | 1.338 | (ASP) | 0.320 | | | | |
| 14 | Filter | Plano | | 0.210 | Glass | 1.517 | 64.2 | — |
| 15 | | Plano | | 0.394 | | | | |
| 16 | Image | Plano | | — | | | | |

Note:
Reference wavelength is 587.6 nm (d-line).

TABLE 6

Aspheric Coefficients

| Surface # | 1 | 2 | 4 | 5 | 6 | 7 |
|---|---|---|---|---|---|---|
| k = | −4.6752E+00 | −6.3565E+00 | −9.6403E−01 | −8.9985E+01 | −9.0000E+01 | −6.0405E+00 |
| A4 = | −7.4740E−02 | −7.5580E−02 | −6.2317E−03 | −9.4747E−02 | −1.0662E−01 | −6.8761E−03 |
| A6 = | −8.8057E−03 | −4.5378E−02 | 8.1679E−03 | 2.5199E−01 | 3.3110E−01 | 1.8932E−01 |
| A8 = | −7.8442E−03 | 5.4041E−02 | 9.8338E−02 | −6.1879E−01 | −6.3648E−01 | −2.9261E−01 |
| A10 = | 3.0671E−02 | 7.6744E−03 | −2.6675E−01 | 1.1176E+00 | 1.1852E+00 | 6.3779E−01 |
| A12 = | −1.9661E−02 | −3.4090E−02 | 3.5020E−01 | −1.1336E+00 | −1.2398E+00 | −7.1336E−01 |
| A14 = | 3.6090E−03 | 1.3908E−02 | −2.0417E−01 | 4.0313E−01 | 4.9949E−01 | 3.6515E−01 |
| A16 = | — | −1.3806E−03 | — | — | — | — |

| Surface # | 8 | 9 | 10 | 11 | 12 | 13 |
|---|---|---|---|---|---|---|
| k = | −7.6687E+01 | 1.5138E+01 | −3.5391E+01 | −1.0000E+00 | −1.2076E+01 | −5.7491E+00 |
| A4 = | −1.1280E−01 | −1.2106E−01 | −9.4722E−02 | −2.8291E−01 | −2.9688E−01 | −1.0331E−01 |
| A6 = | 1.5182E−02 | 1.6695E−02 | 1.0157E−03 | 4.8173E−01 | 2.0718E−01 | 4.6468E−02 |
| A8 = | −4.4075E−02 | −3.6393E−02 | 1.8045E−01 | −5.8808E−01 | −9.8703E−02 | −1.4717E−02 |
| A10 = | 9.4883E−02 | 3.6542E−02 | −6.4838E−01 | 4.3120E−01 | 3.0931E−02 | 2.7601E−03 |
| A12 = | −2.2237E−01 | −3.9961E−02 | 8.0605E−01 | −1.9448E−01 | −5.7899E−03 | −2.8864E−04 |
| A14 = | 2.1807E−01 | 1.9769E−02 | −4.8528E−01 | 4.8815E−02 | 5.8617E−04 | 1.3391E−05 |
| A16 = | −7.8632E−02 | — | 1.1147E−01 | −5.0964E−03 | −2.4859E−05 | −8.9513E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.90 | (f/R8) + (f/R10) | 0.78 |
| Fno | 2.19 | |f/R8| + |f/R10| | 0.78 |
| HFOV [deg.] | 39.3 | f/f1 | −0.17 |
| V4/N4 | 12.23 | f/f6 | −0.25 |
| V3 + V4 + V5 | 60.9 | |f/f1| + |f/f4| | 0.23 |
| T12/T23 | 3.30 | |f/f4| + |f/f5| | 0.20 |
| (T34 + T45)/ΣCT | 0.35 | (f/f2) − (f/f1) + (f/f3) | 1.29 |
| (R2 + R4)/(R2 − R4) | −1.10 | SD/TD | 0.84 |
| (R5 + R6)/(R5 − R6) | 2.45 | TL/f | 1.19 |
| f/R8 | 0.44 | TL/ImgH | 1.43 |
| f/R10 | 0.34 | tan (HFOV) | 0.82 |
| R11/R9 | 0.06 | Yc62/f | 0.35 |

4th Embodiment

Figure 7:
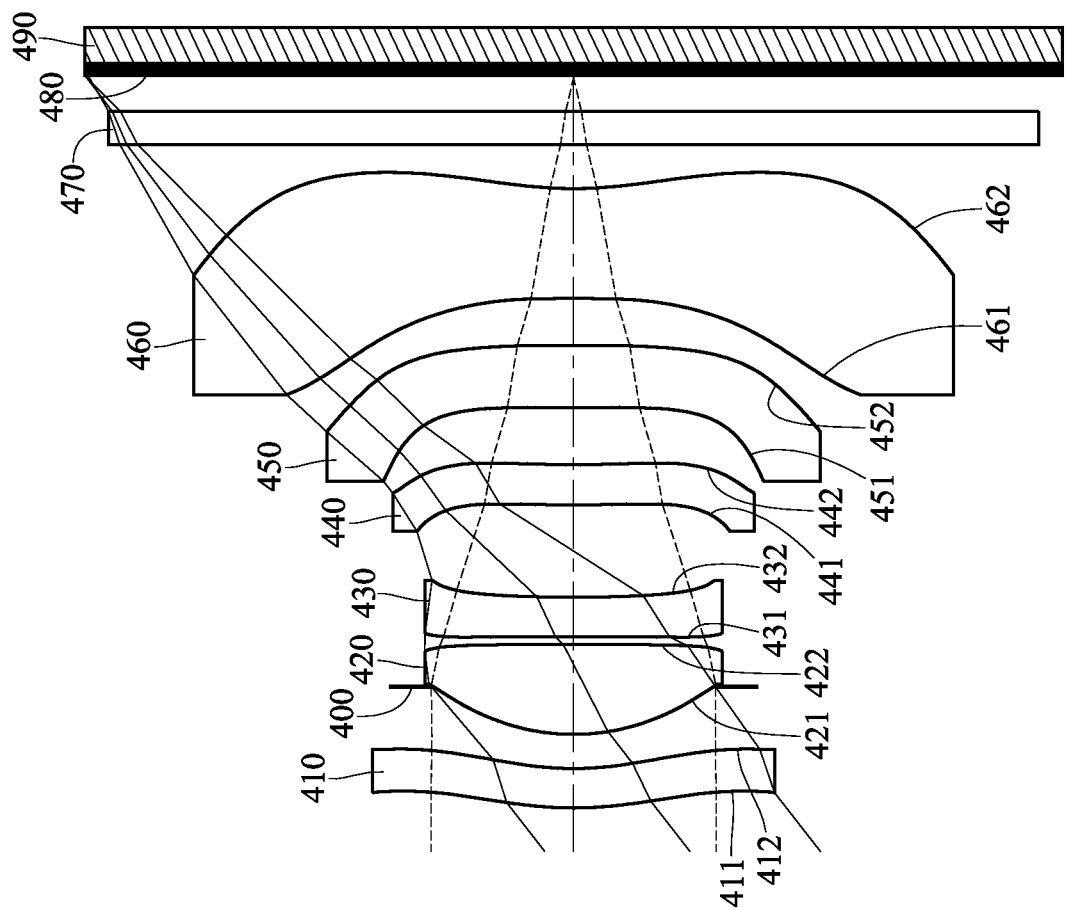
FIG. 7 is a schematic view of an image capturing unit according to the 4th embodiment of the present disclosure.
Figure 8:
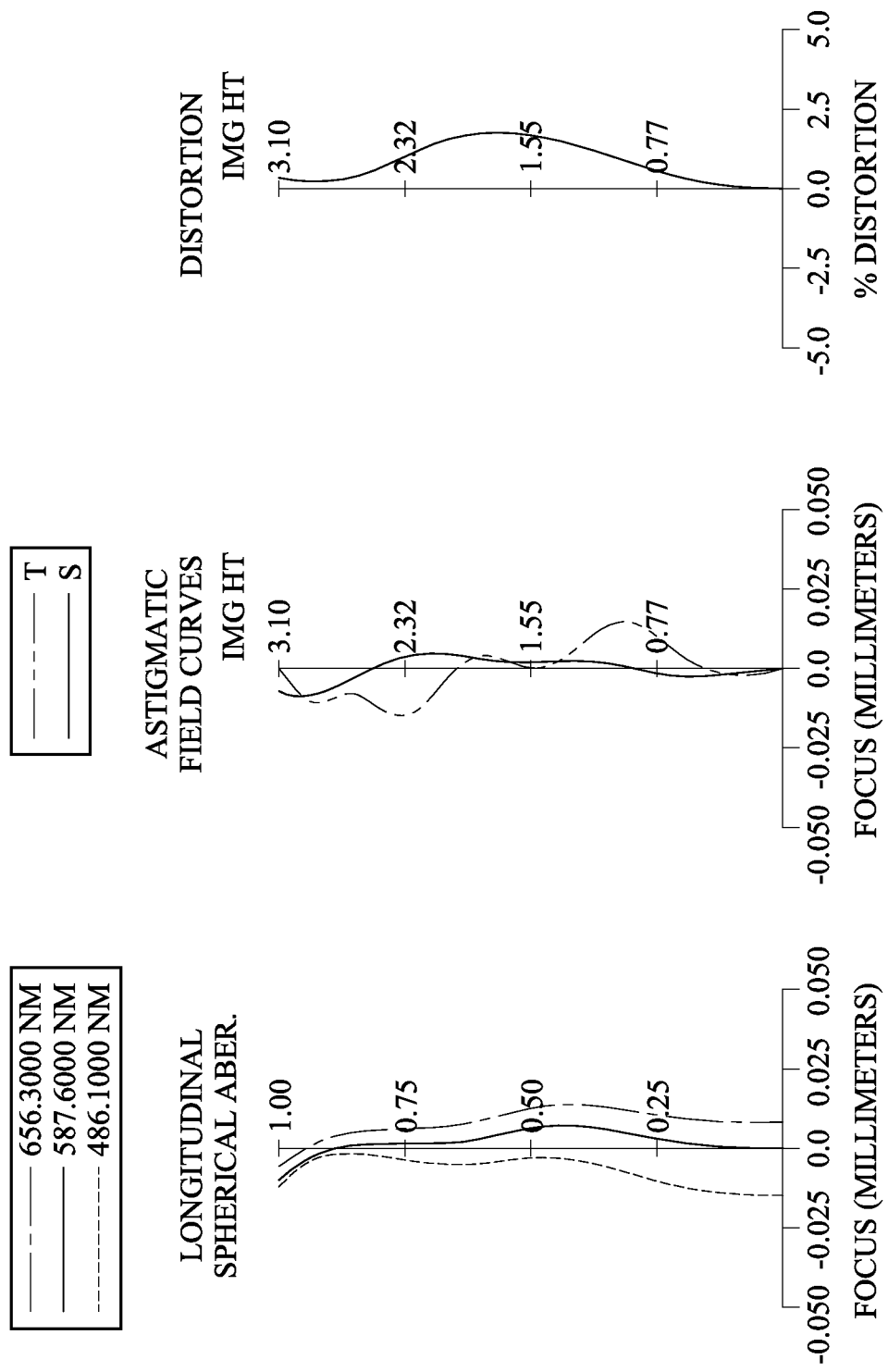
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, a first lens element 410, an aperture stop 400, a second lens element 420, a third lens element 430, a fourth lens element 440, a fifth lens element 450, a sixth lens element 460, a filter 470 and an image surface 480. The photographing optical lens assembly includes six lens elements (410, 420, 430, 440, 450 and 460) with no additional lens element disposed between the first lens element 410 and the sixth lens element 460.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one convex shape in an off-axial region thereof.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one convex shape in an off-axial region thereof.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one inflection point.

The filter 470 is made of glass and located between the sixth lens element 460 and the image surface 480, and will not affect the focal length of the photographing optical lens assembly. The image sensor 490 is disposed on or near the image surface 480 of the photographing optical lens assembly.

The detailed optical data of the 4th embodiment are shown in Table 7 and the aspheric surface data are shown in Table 8 below.

TABLE 7

4th Embodiment
f = 3.97 mm, Fno = 2.19, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.371 | (ASP) | 0.250 | Plastic | 1.660 | 20.3 | −20.64 |
| 2 | | 1.935 | (ASP) | 0.520 | | | | |
| 3 | Ape. Stop | Plano | | −0.303 | | | | |
| 4 | Lens 2 | 1.354 | (ASP) | 0.571 | Plastic | 1.544 | 55.9 | 2.54 |
| 5 | | 55.126 | (ASP) | 0.050 | | | | |
| 6 | Lens 3 | 27.669 | (ASP) | 0.250 | Plastic | 1.660 | 20.3 | −16.38 |
| 7 | | 7.749 | (ASP) | 0.587 | | | | |
| 8 | Lens 4 | 6.995 | (ASP) | 0.256 | Plastic | 1.660 | 20.3 | −48.40 |
| 9 | | 5.655 | (ASP) | 0.363 | | | | |
| 10 | Lens 5 | 20.562 | (ASP) | 0.396 | Plastic | 1.660 | 20.3 | 27.82 |
| 11 | | −170.935 | (ASP) | 0.298 | | | | |
| 12 | Lens 6 | −23.143 | (ASP) | 0.698 | Plastic | 1.534 | 55.9 | −4.00 |
| 13 | | 2.374 | (ASP) | 0.280 | | | | |
| 14 | Filter | Plano | | 0.210 | Glass | 1.517 | 64.2 | — |
| 15 | | Plano | | 0.229 | | | | |
| 16 | Image | Plano | | — | | | | |

Note:
Reference wavelength is 587.6 nm (d-line).

TABLE 8

Aspheric Coefficients

| Surface # | 1 | 2 | 4 | 5 | 6 | 7 |
|---|---|---|---|---|---|---|
| k = | −4.4632E+00 | −6.2829E+00 | −8.2814E−01 | −8.9985E+01 | −1.1984E+00 | −5.6987E+01 |
| A4 = | −8.2039E−02 | −7.6584E−02 | 1.1492E−02 | −8.4325E−02 | −1.4215E−01 | −3.2123E−02 |
| A6 = | −8.3261E−03 | −5.0433E−02 | −2.3768E−02 | 2.0556E−01 | 3.0739E−01 | 1.7934E−01 |
| A8 = | −5.1068E−03 | 5.5294E−02 | 2.0645E−01 | −4.4772E−01 | −5.0585E−01 | −2.7386E−01 |
| A10 = | 3.0818E−02 | 1.2240E−02 | −5.2246E−01 | 6.3741E−01 | 8.3180E−01 | 6.4848E−01 |
| A12 = | −1.9590E−02 | −3.2982E−02 | 6.4882E−01 | −5.3268E−01 | −7.6074E−01 | −7.5969E−01 |
| A14 = | 3.7912E−03 | 1.2602E−02 | −3.4706E−01 | 1.4157E−01 | 2.9886E−01 | 4.2527E−01 |
| A16 = | — | −1.2426E−03 | — | — | — | — |

| Surface # | 8 | 9 | 10 | 11 | 12 | 13 |
|---|---|---|---|---|---|---|
| k = | −7.6687E+01 | 1.5138E+01 | −5.0000E+01 | −1.0000E+00 | −7.8366E+01 | −1.5007E+01 |
| A4 = | −1.7719E−01 | −2.2430E−01 | −1.7872E−01 | −2.1011E−01 | −3.0588E−01 | −7.4964E−02 |

TABLE 8-continued

| Aspheric Coefficients | | | | | |
|---|---|---|---|---|---|
| A6 = | 2.6932E−01 | 2.6102E−01 | 1.3463E−01 | 4.1603E−01 | 3.5337E−01 | 3.9100E−02 |
| A8 = | −1.0744E+00 | −5.8658E−01 | −6.3432E−01 | −5.7369E−01 | −2.6461E−01 | −1.6880E−02 |
| A10 = | 2.3024E+00 | 7.1355E−01 | −5.3163E−01 | 4.3346E−01 | 1.1235E−01 | 4.4952E−03 |
| A12 = | −3.0798E+00 | −5.0070E−01 | 7.9132E−01 | −1.9472E−01 | −2.5840E−02 | −7.4417E−04 |
| A14 = | 2.1723E+00 | 1.4773E−01 | −4.9988E−01 | 4.8598E−02 | 3.0017E−03 | 6.8519E−05 |
| A16 = | −6.4332E−01 | — | 1.1703E−01 | −5.1073E−03 | −1.3665E−04 | −2.6161E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.97 | (f/R8) + (f/R10) | 0.68 |
| Fno | 2.19 | |f/R8| + |f/R10| | 0.73 |
| HFOV [deg.] | 37.8 | f/f1 | −0.19 |
| V4/N4 | 12.23 | f/f6 | −0.99 |
| V3 + V4 + V5 | 60.9 | |f/f1| + |f/f4| | 0.27 |
| T12/T23 | 4.34 | |f/f4| + |f/f5| | 0.22 |
| (T34 + T45)/ΣCT | 0.39 | (f/f2) − (f/f1) + (f/f3) | 1.51 |
| (R2 + R4)/(R2 − R4) | −1.07 | SD/TD | 0.80 |
| (R5 + R6)/(R5 − R6) | 1.78 | TL/f | 1.17 |
| f/R8 | 0.70 | TL/ImgH | 1.50 |
| f/R10 | −0.02 | tan (HFOV) | 0.78 |
| R11/R9 | −1.13 | Yc62/f | 0.30 |

5th Embodiment

Figure 9:
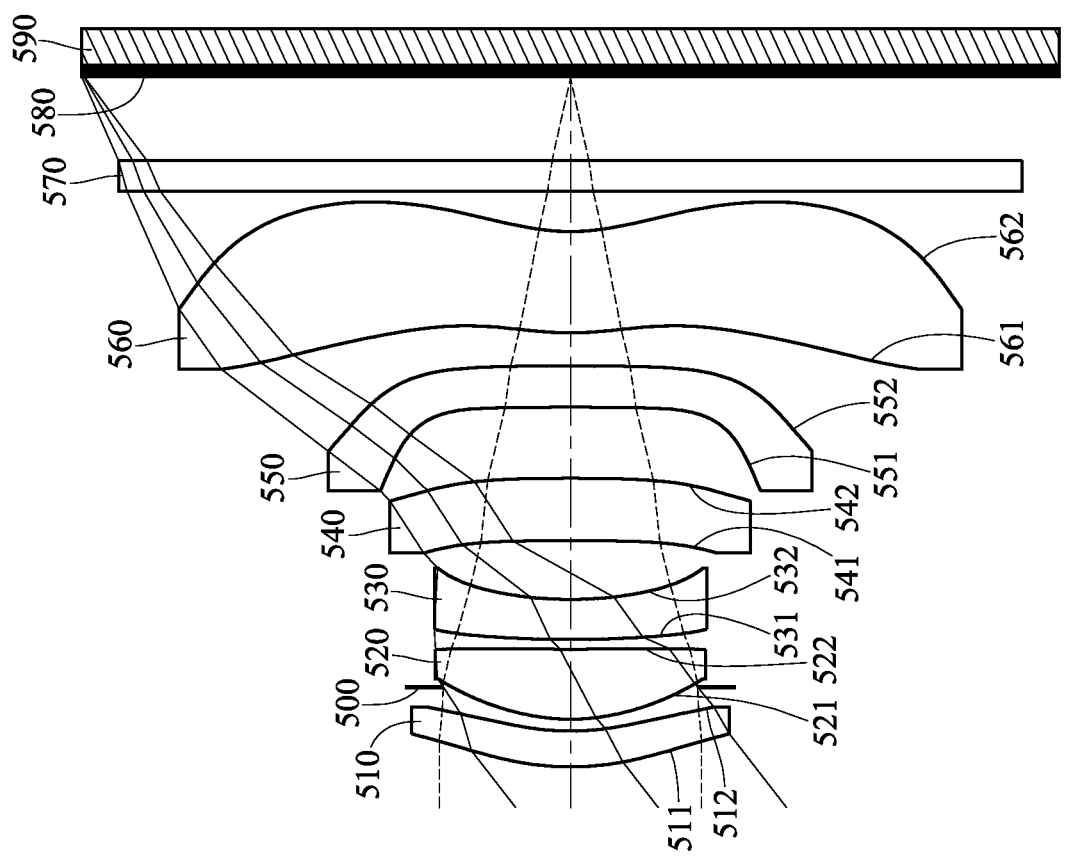
FIG. 9 is a schematic view of an image capturing unit according to the 5th embodiment of the present disclosure.
Figure 10:
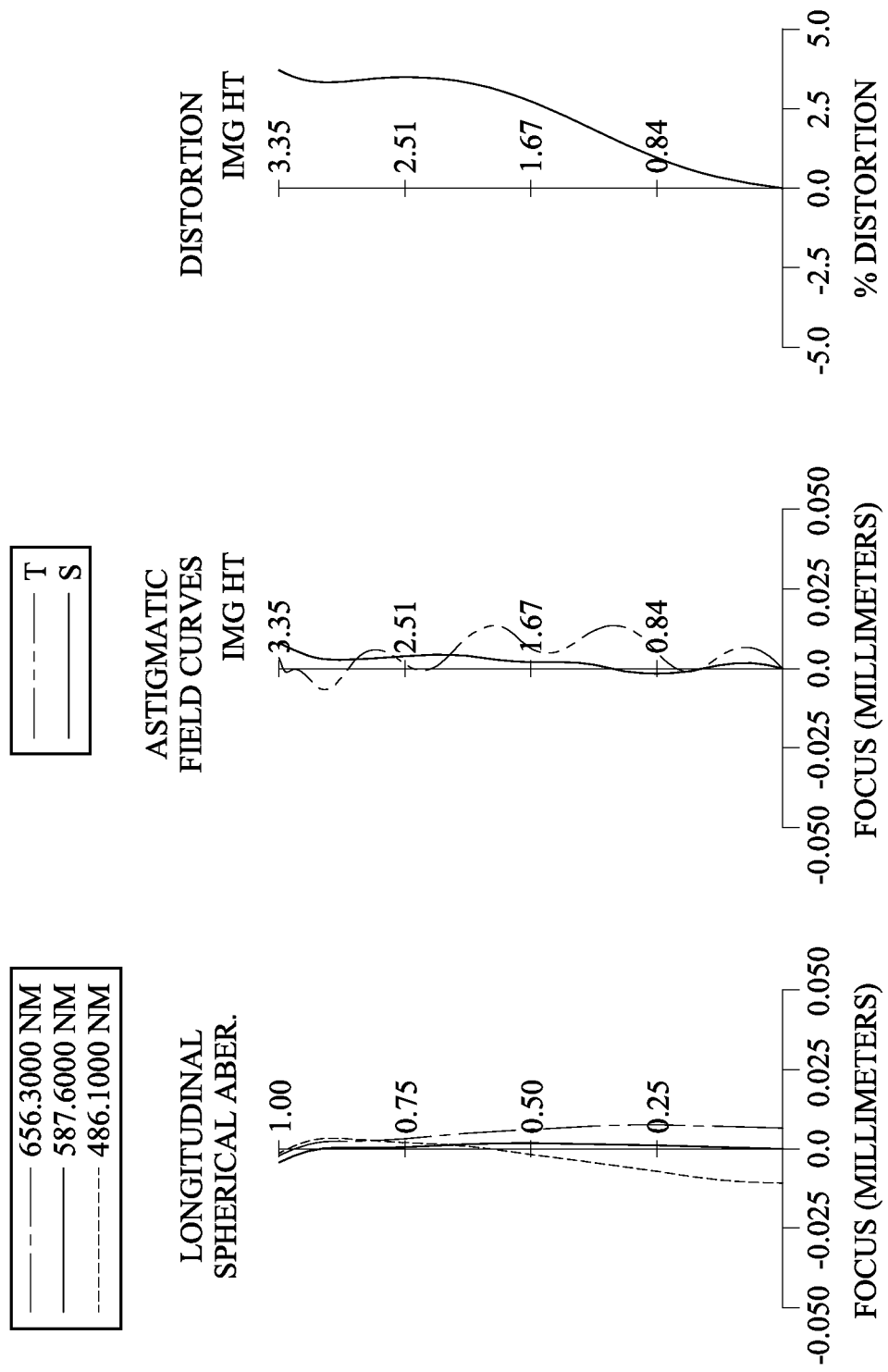
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, a first lens element 510, an aperture stop 500, a second lens element 520, a third lens element 530, a fourth lens element 540, a fifth lens element 550, a sixth lens element 560, a filter 570 and an image surface 580. The photographing optical lens assembly includes six lens elements (510, 520, 530, 540, 550 and 560) with no additional lens element disposed between the first lens element 510 and the sixth lens element 560.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The image-side surface 542 of the fourth lens element 540 has at least one convex shape in an off-axial region thereof.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex shape in an off-axial region thereof.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one inflection point.

The filter 570 is made of glass and located between the sixth lens element 560 and the image surface 580, and will not affect the focal length of the photographing optical lens assembly. The image sensor 590 is disposed on or near the image surface 580 of the photographing optical lens assembly.

The detailed optical data of the 5th embodiment are shown in Table 9 and the aspheric surface data are shown in Table 10 below.

TABLE 9

5th Embodiment
f = 4.16 mm, Fno = 2.30, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.832 | (ASP) | 0.248 | Plastic | 1.534 | 55.9 | −367.97 |
| 2 | | 1.730 | (ASP) | 0.302 | | | | |
| 3 | Ape. Stop | Plano | | −0.220 | | | | |
| 4 | Lens 2 | 1.451 | (ASP) | 0.483 | Plastic | 1.544 | 55.9 | 2.85 |
| 5 | | 20.341 | (ASP) | 0.065 | | | | |
| 6 | Lens 3 | 5.954 | (ASP) | 0.277 | Plastic | 1.671 | 19.3 | −7.06 |
| 7 | | 2.588 | (ASP) | 0.405 | | | | |
| 8 | Lens 4 | −52.833 | (ASP) | 0.430 | Plastic | 1.671 | 19.3 | 48.32 |
| 9 | | −20.155 | (ASP) | 0.490 | | | | |
| 10 | Lens 5 | −26.077 | (ASP) | 0.284 | Plastic | 1.639 | 23.3 | −36.48 |
| 11 | | 220.016 | (ASP) | 0.229 | | | | |
| 12 | Lens 6 | 2.027 | (ASP) | 0.698 | Plastic | 1.534 | 55.9 | −13.97 |
| 13 | | 1.403 | (ASP) | 0.280 | | | | |
| 14 | Filter | Plano | | 0.210 | Glass | 1.517 | 64.2 | — |
| 15 | | Plano | | 0.575 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −1.3236E+00 | −4.1135E+00 | −1.2118E+00 | 2.0000E+01 | 8.3917E−01 | −1.2916E+01 |
| A4 = | −5.1602E−02 | −8.0019E−02 | −2.8883E−02 | −7.2354E−02 | −1.1216E−01 | 5.6662E−02 |
| A6 = | −3.3182E−03 | −4.6764E−02 | 3.3726E−03 | 1.4529E−01 | 2.2875E−01 | 6.0453E−02 |
| A8 = | −4.1625E−02 | 6.6002E−02 | 4.2291E−02 | −2.2747E−01 | −1.9262E−01 | 8.1492E−02 |
| A10 = | 4.8369E−02 | 1.5062E−02 | 8.3803E−04 | 1.9205E−01 | 7.7032E−02 | −1.7945E−01 |
| A12 = | −1.5158E−02 | −3.3436E−02 | −1.0238E−02 | −6.0767E−02 | 3.9404E−02 | 1.6967E−01 |
| A14 = | 6.5256E−04 | 9.7645E−03 | −1.0650E−02 | −1.8546E−02 | −4.0853E−02 | −2.5149E−02 |

| Surface # | 8 | 9 | 10 | 11 | 12 | 13 |
|---|---|---|---|---|---|---|
| k = | −7.7796E+01 | 2.0000E+01 | −5.0000E+01 | −1.0000E+00 | −2.2347E+01 | −6.8084E+00 |
| A4 = | −6.9964E−02 | −5.0941E−02 | 5.4502E−02 | −1.4464E−01 | −1.9617E−01 | −9.0504E−02 |
| A6 = | −8.2241E−02 | −8.5891E−02 | −2.6759E−01 | 3.4386E−01 | 1.1783E−01 | 3.6692E−02 |
| A8 = | 3.6452E−01 | 1.7567E−01 | 5.2756E−01 | −5.3729E−01 | −3.7680E−02 | −1.0570E−02 |
| A10 = | −8.1995E−01 | −1.9063E−01 | −9.5235E−01 | 4.3324E−01 | 6.8453E−03 | 1.8733E−03 |
| A12 = | 1.0314E+00 | 1.1406E−01 | 9.3700E−01 | −1.9846E−01 | −6.8294E−04 | −1.8727E−04 |
| A14 = | −6.7010E−01 | −2.6368E−02 | −4.7511E−01 | 4.8220E−02 | 3.3283E−05 | 7.8053E−06 |
| A16 = | 1.7293E−01 | — | 9.4873E−02 | −4.7596E−03 | −5.5807E−07 | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | |
|---|---|
| f [mm] | 4.16 |
| Fno | 2.30 |
| HFOV [deg.] | 37.8 |
| V4/N4 | 11.55 |
| V3 + V4 + V5 | 61.9 |
| T12/T23 | 1.26 |
| (T34 + T45)/ΣCT | 0.37 |

| 5th Embodiment | | | |
|---|---|---|---|
| (R2 + R4)/(R2 − R4) | −1.19 | SD/TD | 0.85 |
| (R5 + R6)/(R5 − R6) | 2.54 | TL/f | 1.14 |
| f/R8 | −0.21 | TL/ImgH | 1.42 |
| f/R10 | 0.02 | tan (HFOV) | 0.78 |
| R11/R9 | −0.08 | Yc62/f | 0.33 |
| (f/R8) + (f/R10) | −0.19 | | |
| |f/R8| + |f/R10| | 0.23 | | |
| f/f1 | −0.01 | | |
| f/f6 | −0.30 | | |
| |f/f1| + |f/f4| | 0.10 | | |
| |f/f4| + |f/f5| | 0.20 | | |
| (f/f2) − (f/f1) + (f/f3) | 0.88 | | |

6th Embodiment

Figure 11:
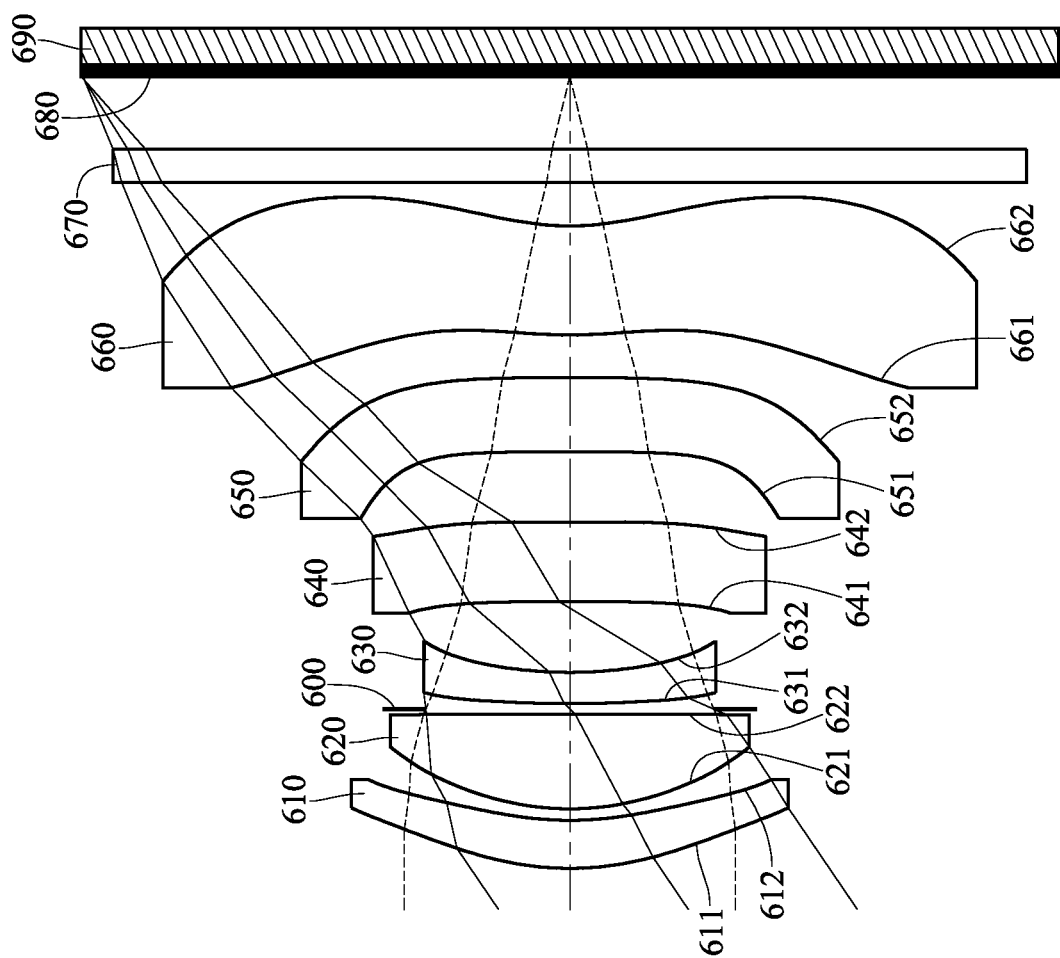
FIG. 11 is a schematic view of an image capturing unit according to the 6th embodiment of the present disclosure.
Figure 12:
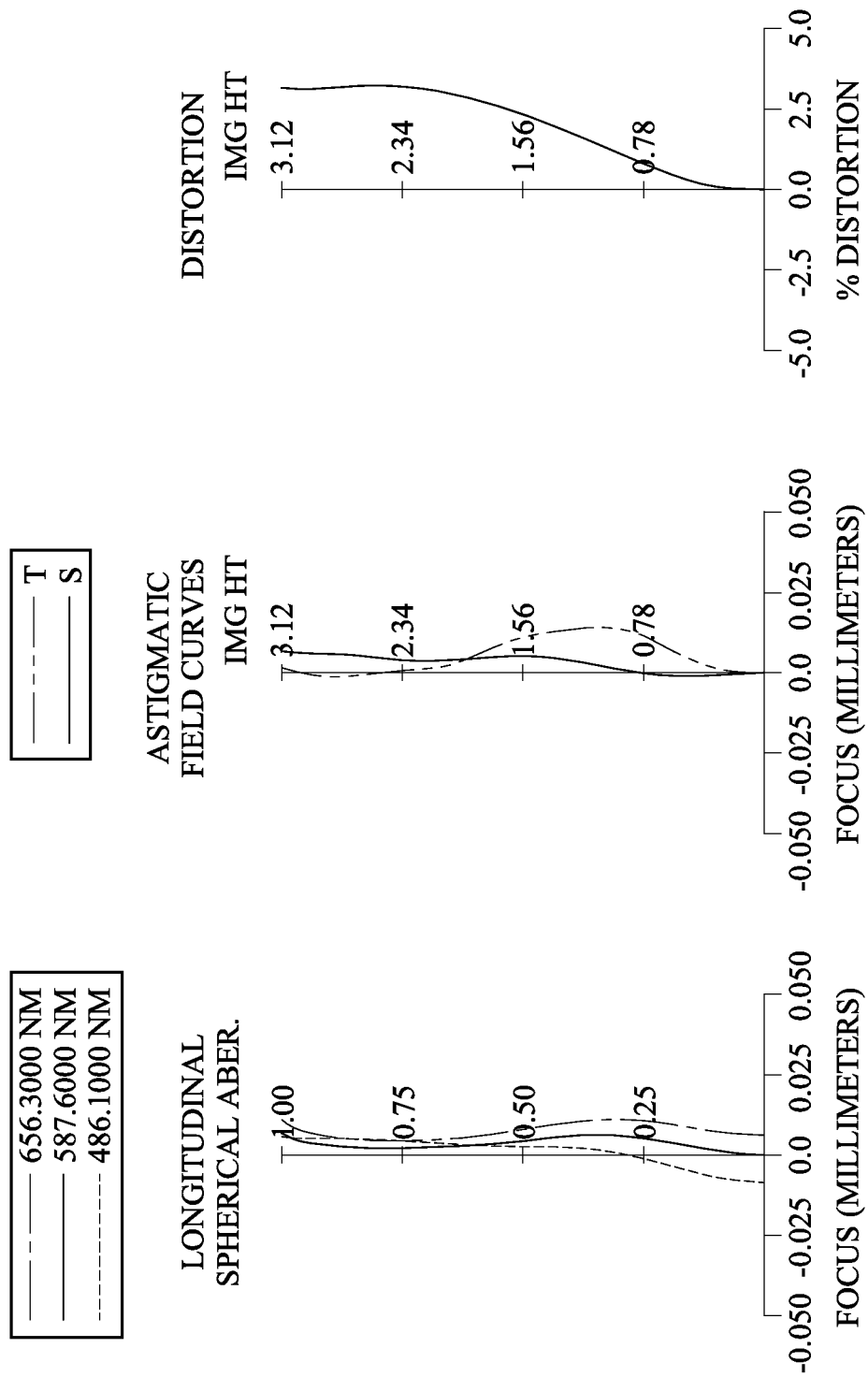
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, a second lens element 620, an aperture stop 600, a third lens element 630, a fourth lens element 640, a fifth lens element 650, a sixth lens element 660, a filter 670 and an image surface 680. The photographing optical lens assembly includes six lens elements (610, 620, 630, 640, 650 and 660) with no additional lens element disposed between the first lens element 610 and the sixth lens element 660.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 has an object-side surface 641 being planar in a paraxial region thereof and an image-side surface 642 being planar in a paraxial region thereof. The fourth lens element 640 is made of plastic material and has the object-side surface 641 and the image-side surface 642 being both aspheric. The image-side surface 642 of the fourth lens element 640 has at least one convex shape in an off-axial region thereof.

The fifth lens element 650 has an object-side surface 651 being planar in a paraxial region thereof and an image-side surface 652 being planar in a paraxial region thereof. The fifth lens element 650 is made of plastic material and has the object-side surface 651 and the image-side surface 652 being both aspheric. The image-side surface 652 of the fifth lens element 650 has at least one convex shape in an off-axial region thereof.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one inflection point.

The filter 670 is made of glass and located between the sixth lens element 660 and the image surface 680, and will not affect the focal length of the photographing optical lens assembly. The image sensor 690 is disposed on or near the image surface 680 of the photographing optical lens assembly.

The detailed optical data of the 6th embodiment are shown in Table 11 and the aspheric surface data are shown in Table 12 below.

TABLE 11

6th Embodiment
f = 4.44 mm, Fno = 2.10, HFOV = 34.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.911 | (ASP) | 0.308 | Plastic | 1.544 | 55.9 | 20.64 |
| 2 | | 2.172 | (ASP) | 0.073 | | | | |
| 3 | Lens 2 | 1.742 | (ASP) | 0.605 | Plastic | 1.544 | 55.9 | 3.36 |
| 4 | | 32.336 | (ASP) | 0.033 | | | | |
| 5 | Ape. Stop | Plano | | 0.035 | | | | |
| 6 | Lens 3 | 6.672 | (ASP) | 0.200 | Plastic | 1.671 | 19.3 | −7.24 |
| 7 | | 2.777 | (ASP) | 0.452 | | | | |
| 8 | Lens 4 | ∞ | (ASP) | 0.510 | Plastic | 1.671 | 19.3 | Infinity |
| 9 | | ∞ | (ASP) | 0.447 | | | | |
| 10 | Lens 5 | ∞ | (ASP) | 0.476 | Plastic | 1.639 | 23.3 | Infinity |
| 11 | | ∞ | (ASP) | 0.273 | | | | |
| 12 | Lens 6 | 3.021 | (ASP) | 0.698 | Plastic | 1.534 | 55.9 | −8.80 |
| 13 | | 1.691 | (ASP) | 0.280 | | | | |
| 14 | Filter | Plano | | 0.210 | Glass | 1.517 | 64.2 | — |
| 15 | | Plano | | 0.465 | | | | |
| 16 | Image | Plano | | — | | | | |

Note:
Reference wavelength is 587.6 nm (d-line).

TABLE 12

Aspheric Coefficients

| Surface # | 1 | 2 | 3 | 4 | 6 | 7 |
|---|---|---|---|---|---|---|
| k = | −3.3098E−01 | −9.7672E−01 | −8.7242E−01 | −8.9099E+01 | −1.4442E+01 | −1.7497E+01 |
| A4 = | −3.0693E−02 | −6.7929E−02 | −1.4272E−02 | −5.5246E−02 | −9.7927E−02 | 4.6462E−02 |
| A6 = | −5.0313E−03 | −5.2288E−02 | −2.9823E−02 | 1.2264E−01 | 2.5231E−01 | 9.3545E−02 |
| A8 = | −3.6581E−02 | 6.3529E−02 | 5.4886E−02 | −2.3226E−01 | −2.9202E−01 | −7.5603E−02 |
| A10 = | 4.0373E−02 | 7.9791E−03 | 4.2990E−03 | 2.8981E−01 | 2.8560E−01 | 1.2290E−01 |

TABLE 12-continued

| Aspheric Coefficients | | | | | | |
|---|---|---|---|---|---|---|
| A12 = | −1.6004E−02 | −2.7892E−02 | −1.9760E−02 | −1.9344E−01 | −1.7578E−01 | −1.3356E−01 |
| A14 = | 2.1542E−03 | 1.0135E−02 | 3.9181E−03 | 5.0726E−02 | 4.8801E−02 | 7.8198E−02 |
| A16 = | 7.1206E−05 | −8.1690E−04 | — | — | — | — |

| Surface # | 8 | 9 | 10 | 11 | 12 | 13 |
|---|---|---|---|---|---|---|
| k = | −7.7796E+01 | 2.0000E+01 | −1.0000E+00 | −1.0000E+00 | −5.5423E+00 | −5.9017E+00 |
| A4 = | −7.0353E−02 | −5.8015E−02 | −4.2990E−02 | −1.0338E−01 | −2.5779E−01 | −9.6984E−02 |
| A6 = | 1.2682E−02 | −7.3117E−03 | −4.3610E−02 | 1.0272E−01 | 1.5532E−01 | 4.2408E−02 |
| A8 = | 5.0025E−03 | 3.2088E−02 | 2.8042E−02 | −9.8537E−02 | −5.5913E−02 | −1.3704E−02 |
| A10 = | −3.8969E−02 | −3.5555E−02 | −5.7556E−02 | 5.3786E−02 | 1.2602E−02 | 2.9463E−03 |
| A12 = | 5.6985E−02 | 2.4515E−02 | 5.1654E−02 | −1.8346E−02 | −1.7171E−03 | −4.0164E−04 |
| A14 = | −3.1323E−02 | −6.1625E−03 | −2.6524E−02 | 3.5610E−03 | 1.2981E−04 | 3.0558E−05 |
| A16 = | 1.2157E−03 | — | 5.6334E−03 | −2.8940E−04 | −4.2214E−06 | −9.7746E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.44 | (f/R8) + (f/R10) | 0.00 |
| Fno | 2.10 | |f/R8| + |f/R10| | 0.00 |
| HFOV [deg.] | 34.2 | f/f1 | 0.22 |
| V4/N4 | 11.55 | f/f6 | −0.50 |
| V3 + V4 + V5 | 61.9 | |f/f1| + |f/f4| | 0.22 |
| T12/T23 | 1.07 | |f/f4| + |f/f5| | 0.00 |
| (T34 + T45)/ΣCT | 0.32 | (f/f2) − (f/f1) + (f/f3) | 0.49 |
| (R2 + R4)/(R2 − R4) | −1.14 | SD/TD | 0.75 |
| (R5 + R6)/(R5 − R6) | 2.43 | TL/f | 1.14 |
| f/R8 | 0.00 | TL/ImgH | 1.63 |
| f/R10 | 0.00 | tan (HFOV) | 0.68 |
| R11/R9 | 0.00 | Yc62/f | 0.31 |

7th Embodiment

Figure 13:
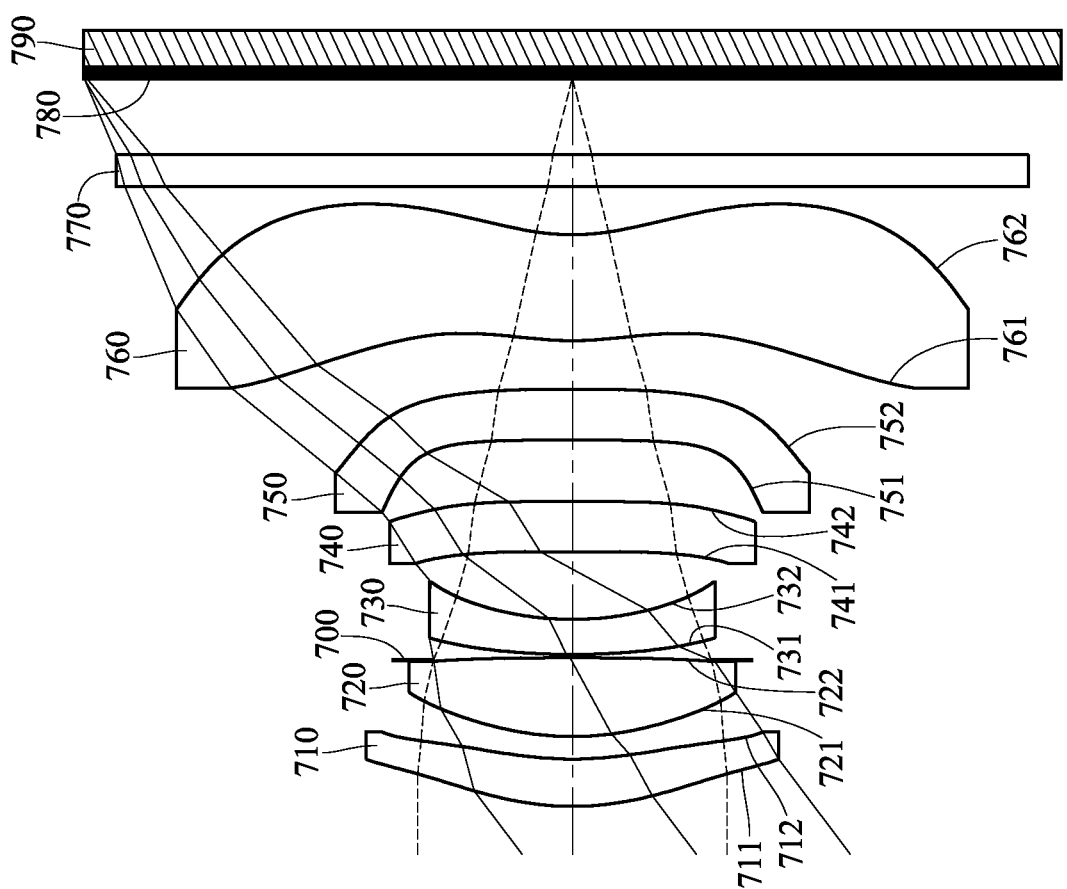
FIG. 13 is a schematic view of an image capturing unit according to the 7th embodiment of the present disclosure.
Figure 14:
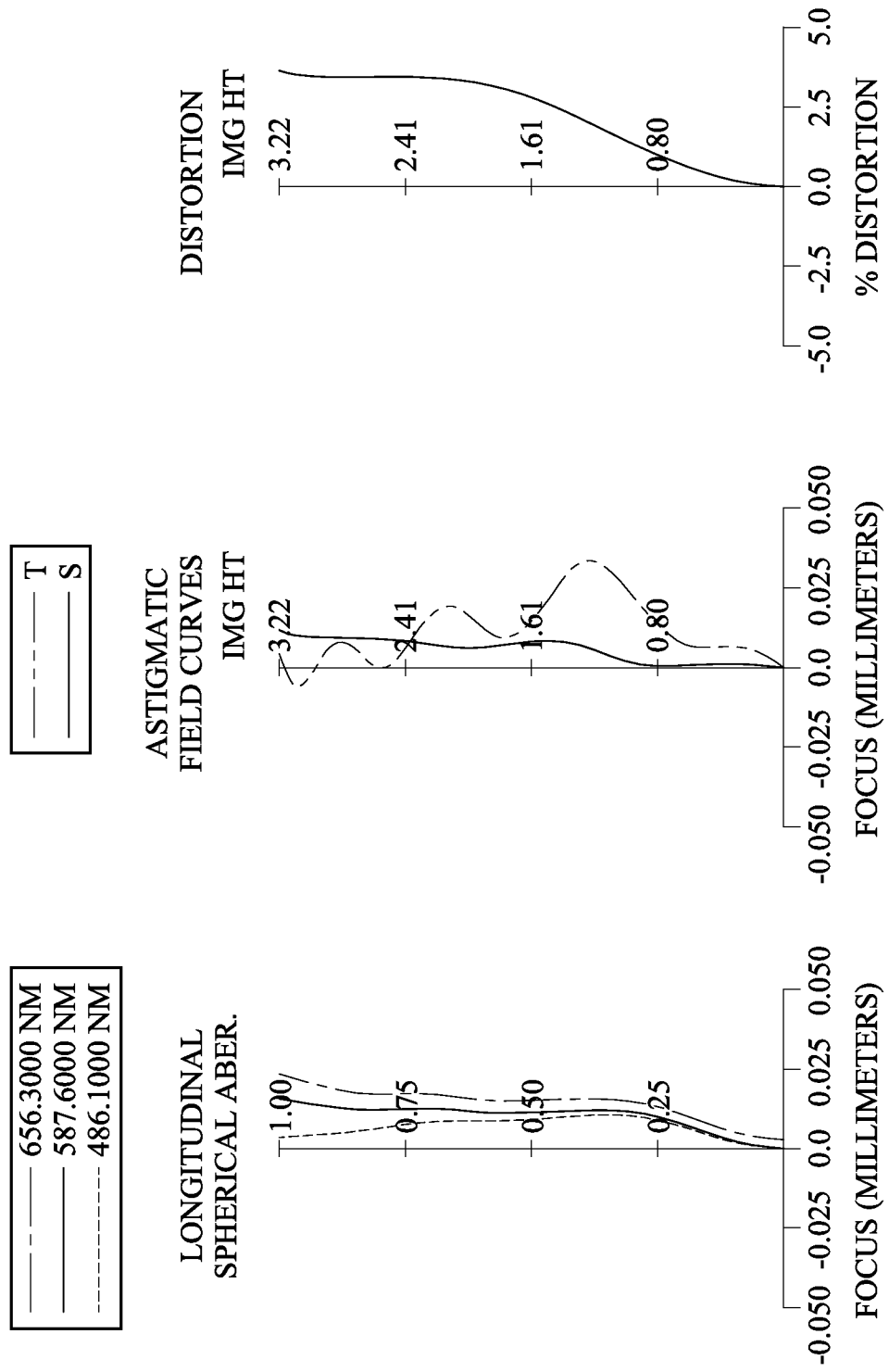
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, a first lens element 710, a second lens element 720, an aperture stop 700, a third lens element 730, a fourth lens element 740, a fifth lens element 750, a sixth lens element 760, a filter 770 and an image surface 780. The photographing optical lens assembly includes six lens elements (710, 720, 730, 740, 750 and 760) with no additional lens element disposed between the first lens element 710 and the sixth lens element 760.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being planar in a paraxial region thereof. The fourth lens element 740 is made of plastic material and has the object-side surface 741 and the image-side surface 742 being both aspheric. The image-side surface 742 of the fourth lens element 740 has at least one convex shape in an off-axial region thereof.

The fifth lens element 750 with negative refractive power has an object-side surface 751 being concave in a paraxial region thereof and an image-side surface 752 being planar in a paraxial region thereof. The fifth lens element 750 is made of plastic material and has the object-side surface 751 and the image-side surface 752 being both aspheric. The image-side surface 752 of the fifth lens element 750 has at least one convex shape in an off-axial region thereof.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one inflection point.

The filter 770 is made of glass and located between the sixth lens element 760 and the image surface 780, and will not affect the focal length of the photographing optical lens assembly. The image sensor 790 is disposed on or near the image surface 780 of the photographing optical lens assembly.

The detailed optical data of the 7th embodiment are shown in Table 13 and the aspheric surface data are shown in Table 14 below.

TABLE 13

7th Embodiment
f = 4.11 mm, Fno = 2.02, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.903 | (ASP) | 0.312 | Plastic | 1.544 | 55.9 | 13.66 |
| 2 | | 2.411 | (ASP) | 0.148 | | | | |
| 3 | Lens 2 | 1.917 | (ASP) | 0.520 | Plastic | 1.544 | 55.9 | 3.22 |
| 4 | | −18.437 | (ASP) | −0.015 | | | | |
| 5 | Ape. Stop | Plano | | 0.036 | | | | |
| 6 | Lens 3 | 4.588 | (ASP) | 0.231 | Plastic | 1.671 | 19.3 | −5.49 |
| 7 | | 2.001 | (ASP) | 0.446 | | | | |
| 8 | Lens 4 | 154.168 | (ASP) | 0.330 | Plastic | 1.671 | 19.3 | 229.80 |
| 9 | | ∞ | (ASP) | 0.405 | | | | |
| 10 | Lens 5 | −95.716 | (ASP) | 0.335 | Plastic | 1.671 | 19.3 | −142.67 |
| 11 | | ∞ | (ASP) | 0.321 | | | | |
| 12 | Lens 6 | 2.060 | (ASP) | 0.698 | Plastic | 1.534 | 55.9 | −14.72 |
| 13 | | 1.440 | (ASP) | 0.320 | | | | |
| 14 | Filter | Plano | | 0.210 | Glass | 1.517 | 64.2 | — |
| 15 | | Plano | | 0.499 | | | | |
| 16 | Image | Plano | | — | | | | |

Note:
Reference wavelength is 587.6 nm (d-line).

TABLE 14

Aspheric Coefficients

| Surface # | 1 | 2 | 3 | 4 | 6 | 7 |
|---|---|---|---|---|---|---|
| k = | −7.0004E−01 | −1.8431E+00 | −1.2802E+00 | −8.9099E+01 | 3.7476E+00 | −1.2320E+01 |
| A4 = | −3.8631E−02 | −7.8610E−02 | −2.3103E−02 | 3.9961E−02 | −1.4098E−02 | 1.3733E−01 |
| A6 = | −1.2883E−02 | −5.8774E−02 | 2.8770E−04 | −1.7251E−01 | −3.3267E−01 | −9.5194E−02 |
| A8 = | −3.7710E−02 | 6.5587E−02 | −1.0018E−01 | 3.3260E−01 | 2.5473E−01 | 1.8029E−01 |
| A10 = | 4.2935E−02 | 1.1654E−02 | 2.9486E−01 | −3.5895E−01 | −3.9743E−01 | −1.3519E−01 |
| A12 = | −1.5479E−02 | −2.8652E−02 | −2.6262E−01 | 1.8972E−01 | 2.6193E−01 | −1.3600E−02 |
| A14 = | 2.0156E−03 | 8.9222E−03 | 8.0860E−02 | −3.4371E−02 | −5.5213E−02 | 6.7069E−02 |

| Surface # | 8 | 9 | 10 | 11 | 12 | 13 |
|---|---|---|---|---|---|---|
| k = | −7.7796E+01 | 2.0000E+01 | −4.9995E+01 | −1.0000E+00 | −1.9536E+01 | −6.5577E+00 |
| A4 = | −7.7644E−02 | −6.4303E−02 | −5.1773E−02 | −2.1834E−01 | −2.0030E−01 | −8.8063E−02 |
| A6 = | −3.4202E−02 | −7.3951E−02 | −6.0762E−02 | 4.1725E−01 | 1.0683E−01 | 3.4338E−02 |
| A8 = | 1.8806E−01 | 1.7959E−01 | 2.8220E−01 | −5.6025E−01 | −3.2315E−02 | −1.0155E−02 |
| A10 = | −4.0660E−01 | −2.3897E−01 | −7.6848E−01 | 4.2920E−01 | 5.9631E−03 | 1.8551E−03 |
| A12 = | 4.6594E−01 | 1.7117E−01 | 8.8495E−01 | −1.9685E−01 | −6.4445E−04 | −1.9026E−04 |
| A14 = | −2.4331E−01 | −4.6347E−02 | −5.0136E−01 | 4.8688E−02 | 3.7094E−05 | 8.1158E−06 |
| A16 = | 3.6540E−02 | — | 1.0963E−01 | −4.8599E−03 | −8.7591E−07 | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.11 | (f/R8) + (f/R10) | 0.00 |
| Fno | 2.02 | |f/R8| + |f/R10| | 0.00 |
| HFOV [deg.] | 37.0 | f/f1 | 0.30 |
| V4/N4 | 11.55 | f/f6 | −0.28 |
| V3 + V4 + V5 | 57.9 | |f/f1| + |f/f4| | 0.32 |
| T12/T23 | 7.05 | |f/f4| + |f/f5| | 0.05 |
| (T34 + T45)/ΣCT | 0.35 | (f/f2) − (f/f1) + (f/f3) | 0.23 |

-continued

| 7th Embodiment | | | |
|---|---|---|---|
| (R2 + R4)/(R2 − R4) | −0.77 | SD/TD | 0.74 |
| (R5 + R6)/(R5 − R6) | 2.55 | TL/f | 1.17 |
| f/R8 | 0.00 | TL/ImgH | 1.49 |
| f/R10 | 0.00 | tan (HFOV) | 0.75 |
| R11/R9 | −0.02 | Yc62/f | 0.33 |

8th Embodiment

Figure 15:
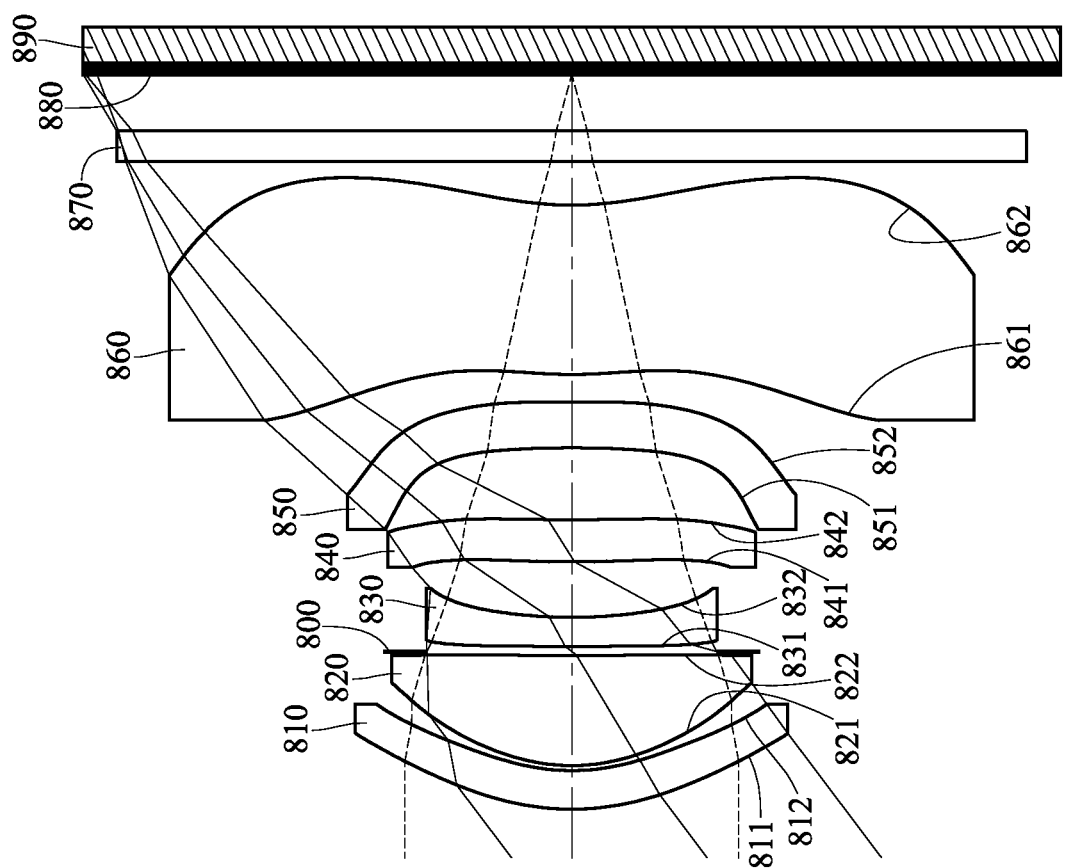
FIG. 15 is a schematic view of an image capturing unit according to the 8th embodiment of the present disclosure.
Figure 16:
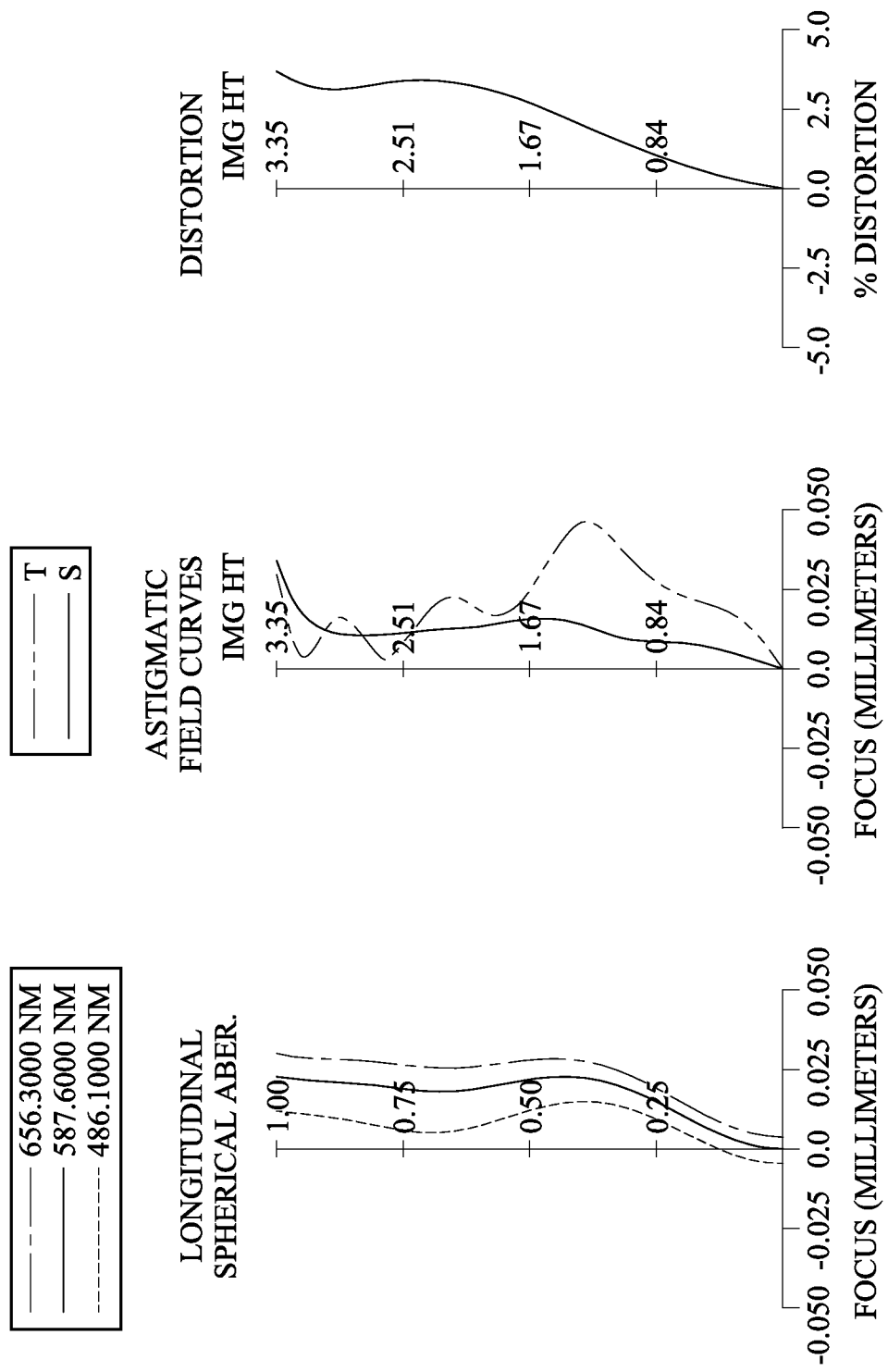
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 890. The photographing optical lens assembly includes, in order from an object side to an image side, a first lens element 810, a second lens element 820, an aperture stop 800, a third lens element 830, a fourth lens element 840, a fifth lens element 850, a sixth lens element 860, a filter 870 and an image surface 880. The photographing optical lens assembly includes six lens elements (810, 820, 830, 840, 850 and 860) with no additional lens element disposed between the first lens element 810 and the sixth lens element 860.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one convex shape in an off-axial region thereof.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex shape in an off-axial region thereof.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one inflection point.

The filter 870 is made of glass and located between the sixth lens element 860 and the image surface 880, and will not affect the focal length of the photographing optical lens assembly. The image sensor 890 is disposed on or near the image surface 880 of the photographing optical lens assembly.

The detailed optical data of the 8th embodiment are shown in Table 15 and the aspheric surface data are shown in Table 16 below.

TABLE 15

8th Embodiment
f = 4.28 mm, Fno = 1.89, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.795 | (ASP) | 0.265 | Plastic | 1.583 | 30.2 | −15.65 |
| 2 | | 1.418 | (ASP) | 0.035 | | | | |
| 3 | Lens 2 | 1.309 | (ASP) | 0.758 | Plastic | 1.544 | 55.9 | 2.43 |
| 4 | | 122.525 | (ASP) | 0.026 | | | | |
| 5 | Ape. Stop | Plano | | 0.035 | | | | |
| 6 | Lens 3 | 19.595 | (ASP) | 0.200 | Plastic | 1.650 | 21.5 | −6.12 |
| 7 | | 3.297 | (ASP) | 0.381 | | | | |
| 8 | Lens 4 | 6.972 | (ASP) | 0.290 | Plastic | 1.671 | 19.3 | 21.24 |
| 9 | | 13.421 | (ASP) | 0.494 | | | | |
| 10 | Lens 5 | −8.620 | (ASP) | 0.316 | Plastic | 1.639 | 23.3 | −12.84 |
| 11 | | 170.268 | (ASP) | 0.188 | | | | |
| 12 | Lens 6 | 2.882 | (ASP) | 1.164 | Plastic | 1.534 | 55.9 | −51.25 |
| 13 | | 2.241 | (ASP) | 0.300 | | | | |
| 14 | Filter | Plano | | 0.210 | Glass | 1.517 | 64.2 | — |
| 15 | | Plano | | 0.385 | | | | |
| 16 | Image | Plano | | — | | | | |

Note:
Reference wavelength is 587.6 nm (d-line).

TABLE 16

Aspheric Coefficients

| Surface # | 1 | 2 | 3 | 4 | 6 | 7 |
|---|---|---|---|---|---|---|
| k = | −2.2911E−01 | −1.1972E+00 | −1.1414E+00 | −8.9099E+01 | −9.0000E+01 | −2.0766E+01 |
| A4 = | −3.2655E−02 | −7.2102E−02 | −2.4477E−02 | −2.5372E−02 | −9.2332E−02 | 9.0069E−05 |
| A6 = | 6.8050E−03 | −5.7170E−02 | −2.9979E−02 | 1.2543E−01 | 2.8132E−01 | 2.0766E−01 |
| A8 = | −3.8921E−02 | 6.3257E−02 | 5.9378E−02 | −2.7533E−01 | −4.4445E−01 | −4.3049E−01 |
| A10 = | 3.9149E−02 | 1.2398E−02 | −4.5797E−03 | 3.1034E−01 | 4.9906E−01 | 7.8811E−01 |

TABLE 16-continued

| Aspheric Coefficients | | | | | |
|---|---|---|---|---|---|
| A12 = −1.6275E−02 | −2.7242E−02 | −9.3001E−03 | −1.7889E−01 | −3.1222E−01 | −7.6371E−01 |
| A14 = 2.4824E−03 | 7.2850E−03 | 5.3822E−06 | 4.0746E−02 | 8.4554E−02 | 3.1470E−01 |

| Surface # | 8 | 9 | 10 | 11 | 12 | 13 |
|---|---|---|---|---|---|---|
| k = | −7.7796E+01 | 2.0000E+01 | −1.0000E+00 | −1.0000E+00 | −4.9380E+01 | −6.4901E+00 |
| A4 = | −5.0373E−02 | −4.9230E−02 | −6.1646E−02 | −2.9593E−01 | −1.7130E−01 | −5.6370E−02 |
| A6 = | −5.5653E−02 | −6.9216E−02 | −4.3724E−02 | 4.6579E−01 | 9.1456E−02 | 1.8515E−02 |
| A8 = | 1.5263E−01 | 1.4149E−01 | 2.8016E−01 | −5.6830E−01 | −2.8773E−02 | −4.7948E−03 |
| A10 = | −2.9563E−01 | −1.8699E−01 | −7.6215E−01 | 4.2609E−01 | 5.8887E−03 | 7.5961E−04 |
| A12 = | 3.0878E−01 | 1.3184E−01 | 8.7646E−01 | −1.9677E−01 | −7.9978E−04 | −6.9875E−05 |
| A14 = | −1.4333E−01 | −3.4294E−02 | −4.9892E−01 | 4.8853E−02 | 7.4563E−05 | 2.7436E−06 |
| A16 = | 1.7736E−02 | — | 1.1040E−01 | −4.7857E−03 | −3.8441E−06 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.28 | (f/R8) + (f/R10) | 0.34 |
| Fno | 1.89 | \|f/R8\| + \|f/R10\| | 0.34 |
| HFOV [deg.] | 36.9 | f/f1 | −0.27 |
| V4/N4 | 11.55 | f/f6 | −0.08 |
| V3 + V4 + V5 | 64.1 | \|f/f1\| + \|f/f4\| | 0.48 |
| T12/T23 | 0.57 | \|f/f4\| + \|f/f5\| | 0.54 |
| (T34 + T45)/ΣCT | 0.29 | (f/f2) − (f/f1) + (f/f3) | 1.34 |
| (R2 + R4)/(R2 − R4) | −1.02 | SD/TD | 0.74 |
| (R5 + R6)/(R5 − R6) | 1.40 | TL/f | 1.18 |
| f/R8 | 0.32 | TL/ImgH | 1.51 |
| f/R10 | 0.03 | tan (HFOV) | 0.75 |
| R11/R9 | −0.33 | Yc62/f | 0.36 |

9th Embodiment

Figure 17:
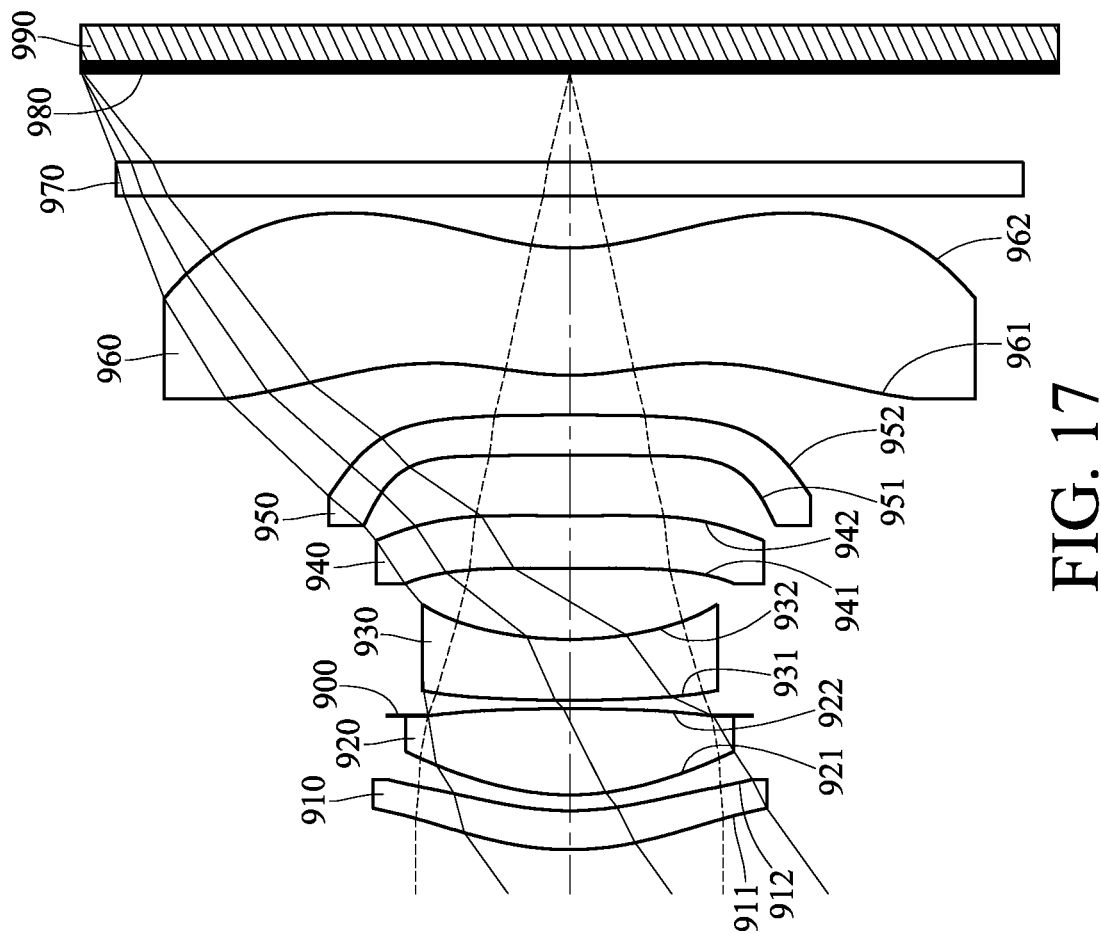
FIG. 17 is a schematic view of an image capturing unit according to the 9th embodiment of the present disclosure.
Figure 18:
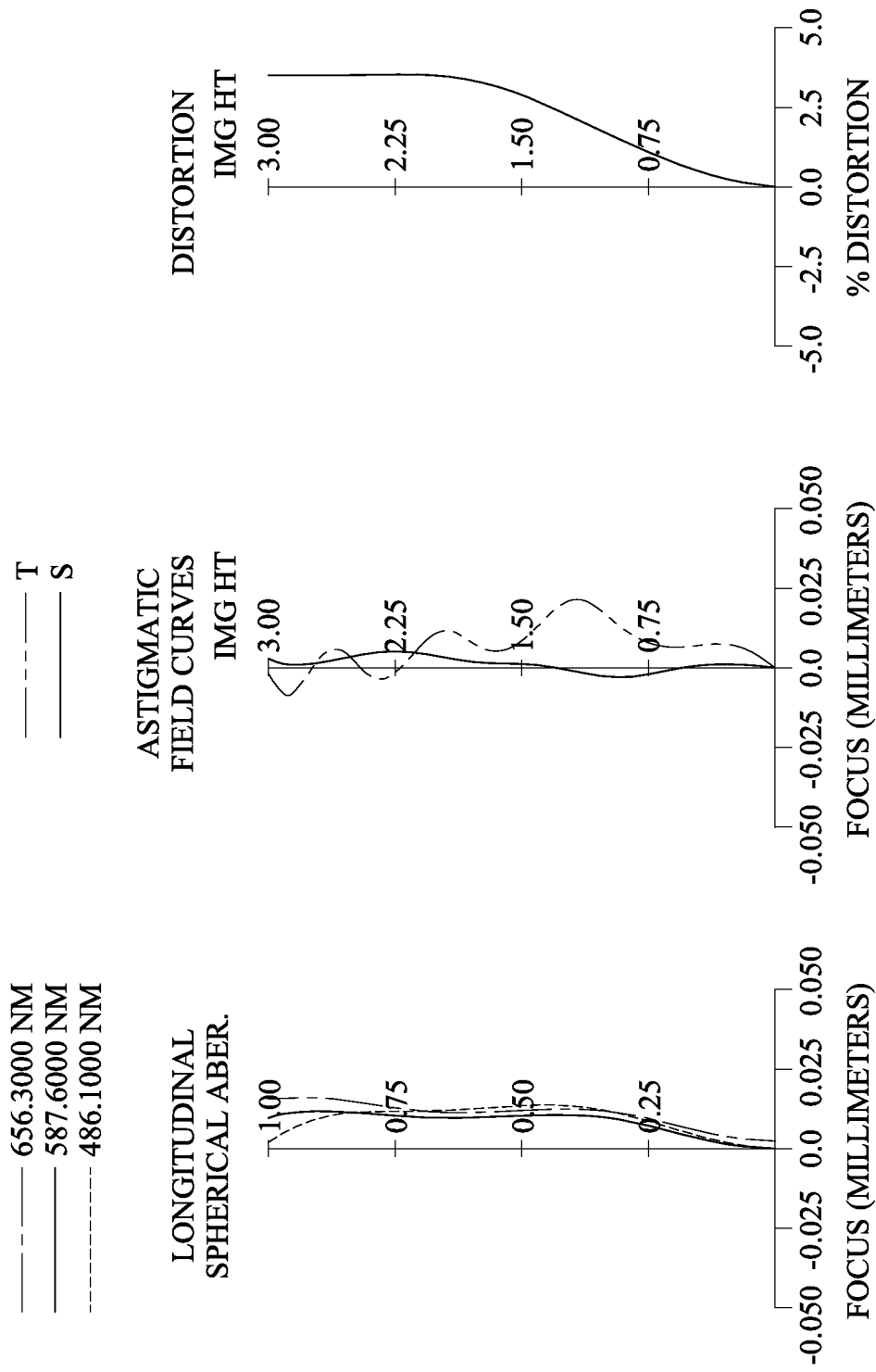
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens assembly (its reference numeral is omitted) of the present disclosure and an image sensor 990. The photographing optical lens assembly includes, in order from an object side to an image side, a first lens element 910, a second lens element 920, an aperture stop 900, a third lens element 930, a fourth lens element 940, a fifth lens element 950, a sixth lens element 960, a filter 970 and an image surface 980. The photographing optical lens assembly includes six lens elements (910, 920, 930, 940, 950 and 960) with no additional lens element disposed between the first lens element 910 and the sixth lens element 960.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The image-side surface 942 of the fourth lens element 940 has at least one convex shape in an off-axial region thereof.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one convex shape in an off-axial region thereof.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The image-side surface 962 of the sixth lens element 960 has at least one inflection point.

The filter 970 is made of glass and located between the sixth lens element 960 and the image surface 980, and will not affect the focal length of the photographing optical lens assembly. The image sensor 990 is disposed on or near the image surface 980 of the photographing optical lens assembly.

The detailed optical data of the 9th embodiment are shown in Table 17 and the aspheric surface data are shown in Table 18 below.

TABLE 17

9th Embodiment
f = 4.02 mm, Fno = 2.13, HFOV = 35.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.832 | (ASP) | 0.239 | Plastic | 1.534 | 55.9 | 105.70 |
| 2 | | 1.808 | (ASP) | 0.098 | | | | |
| 3 | Lens 2 | 1.621 | (ASP) | 0.530 | Plastic | 1.544 | 55.9 | 2.72 |
| 4 | | −15.309 | (ASP) | −0.040 | | | | |
| 5 | Ape. Stop | Plano | | 0.092 | | | | |
| 6 | Lens 3 | 7.960 | (ASP) | 0.375 | Plastic | 1.661 | 20.3 | −5.12 |
| 7 | | 2.329 | (ASP) | 0.436 | | | | |
| 8 | Lens 4 | 34.518 | (ASP) | 0.324 | Plastic | 1.642 | 22.5 | 1013.89 |
| 9 | | 36.318 | (ASP) | 0.373 | | | | |
| 10 | Lens 5 | −20.403 | (ASP) | 0.246 | Plastic | 1.660 | 20.3 | −32.73 |
| 11 | | −366.382 | (ASP) | 0.245 | | | | |
| 12 | Lens 6 | 1.753 | (ASP) | 0.783 | Plastic | 1.534 | 55.9 | 127.95 |
| 13 | | 1.520 | (ASP) | 0.320 | | | | |
| 14 | Filter | Plano | | 0.210 | Glass | 1.517 | 64.2 | — |
| 15 | | Plano | | 0.543 | | | | |
| 16 | Image | Plano | | — | | | | |

Note:
Reference wavelength is 865.0 nm.

TABLE 18

Aspheric Coefficients

| Surface # | 1 | 2 | 3 | 4 | 6 | 7 |
|---|---|---|---|---|---|---|
| k = | −1.1929E+00 | −4.0744E+00 | −1.6236E+00 | −9.0000E+01 | 8.3966E−01 | −1.0806E+01 |
| A4 = | −4.9173E−02 | −7.4492E−02 | −4.2457E−02 | −7.8175E−02 | −7.8257E−02 | 8.3906E−02 |
| A6 = | −6.2690E−04 | −4.4999E−02 | −1.6475E−02 | 1.5251E−01 | 2.4331E−01 | 3.3473E−02 |
| A8 = | −4.4731E−02 | 6.0848E−02 | 4.3495E−02 | −2.2876E−01 | −3.0753E−01 | 8.0628E−03 |
| A10 = | 4.5575E−02 | 1.2947E−02 | 4.6790E−03 | 1.8420E−01 | 2.6807E−01 | −2.7895E−02 |
| A12 = | −1.5043E−02 | −2.9339E−02 | −1.9276E−02 | −7.3932E−02 | −1.3855E−01 | 1.4662E−02 |
| A14 = | 1.1884E−03 | 8.5054E−03 | 9.2983E−04 | 7.9187E−03 | 3.7143E−02 | 2.2539E−02 |

| Surface # | 8 | 9 | 10 | 11 | 12 | 13 |
|---|---|---|---|---|---|---|
| k = | −7.7796E+01 | 2.0000E+01 | −6.6081E+00 | −1.0000E+00 | −1.4372E+01 | −5.0526E+00 |
| A4 = | −9.4184E−02 | −5.6943E−02 | 8.2623E−02 | −1.6761E−01 | −1.5638E−01 | −9.4540E−02 |
| A6 = | −1.2722E−01 | −1.8585E−01 | −2.7127E−01 | 3.6797E−01 | 5.5642E−02 | 3.7738E−02 |
| A8 = | 4.8865E−01 | 3.7387E−01 | 5.1875E−01 | −5.4746E−01 | −2.6745E−03 | −1.1707E−02 |
| A10 = | −9.3450E−01 | −4.2302E−01 | −9.3058E−01 | 4.3047E−01 | −3.4016E−03 | 2.2384E−03 |
| A12 = | 9.7287E−01 | 2.5750E−01 | 9.2270E−01 | −1.9846E−01 | 1.0114E−03 | −2.3661E−04 |
| A14 = | −4.9482E−01 | −6.1456E−02 | −4.7920E−01 | 4.8420E−02 | −1.1746E−04 | 1.0349E−05 |
| A16 = | 8.5564E−02 | — | 9.8871E−02 | −4.6354E−03 | 5.0633E−06 | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.02 | (f/R8) + (f/R10) | 0.10 |
| Fno | 2.13 | \|f/R8\| + \|f/R10\| | 0.12 |
| HFOV [deg.] | 35.7 | f/f1 | 0.04 |
| V4/N4 | 13.70 | f/f6 | 0.03 |
| V3 + V4 + V5 | 63.1 | \|f/f1\| + \|f/f4\| | 0.04 |
| T12/T23 | 1.88 | \|f/f4\| + \|f/f5\| | 0.13 |
| (T34 + T45)/ΣCT | 0.32 | (f/f2) − (f/f1) + (f/f3) | 0.65 |

-continued

| 9th Embodiment | | | |
|---|---|---|---|
| (R2 + R4)/(R2 − R4) | −0.79 | SD/TD | 0.78 |
| (R5 + R6)/(R5 − R6) | 1.83 | TL/f | 1.19 |
| f/R8 | 0.11 | TL/ImgH | 1.59 |
| f/R10 | −0.01 | tan (HFOV) | 0.72 |
| R11/R9 | −0.09 | Yc62/f | 0.34 |

10th Embodiment

Figure 19:
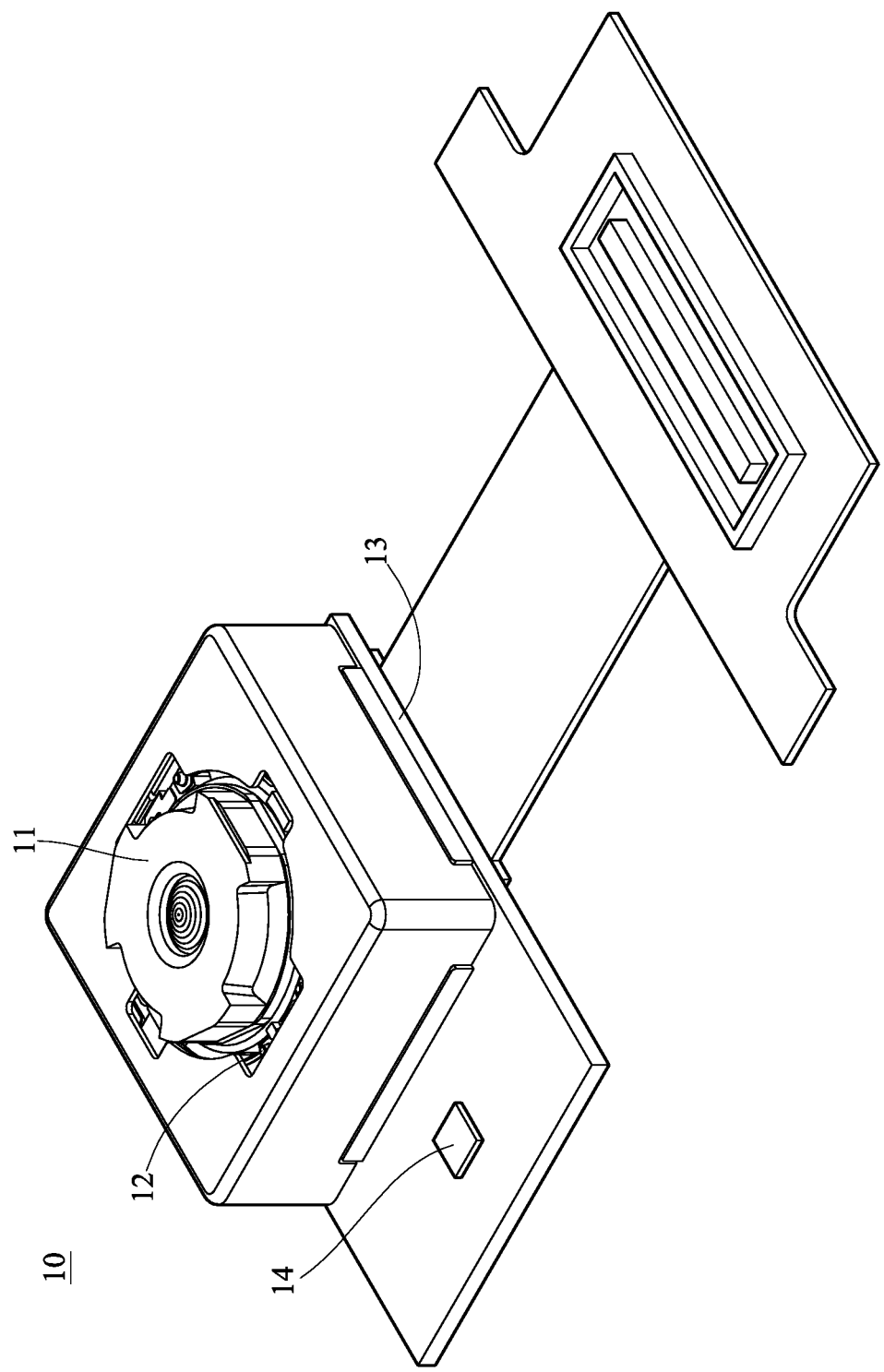
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the photographing optical lens assembly disclosed in the 1st embodiment, a barrel and a holder member (their reference numerals are omitted) for holding the photographing optical lens assembly. The external light converges into the lens unit 11 of the image capturing unit 10 to generate an image, and the lens unit 11 along with the driving device 12 is utilized for image focusing on the image sensor 13, and the image is able to be digitally transmitted to an electronic component.

The driving device 12 can have auto focusing functionality, and different driving configurations can be through the use of voice coil motors (VCM), micro electro-mechanical systems (MEMS), piezoelectric systems, or shape memory alloy materials. The driving device 12 is favorable for the lens unit 11 to obtain a better imaging position, so that a clear image of the imaged object can be captured by the lens unit 11 with different object distances. The image sensor 13 (for example, CCD or CMOS) can be featured with high photosensitivity and low noise, disposed on the image surface of the photographing optical lens assembly to provide higher image quality.

The image stabilizer 14, such as an accelerometer, a gyroscope and a Hall effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

11th Embodiment

Figure 20:
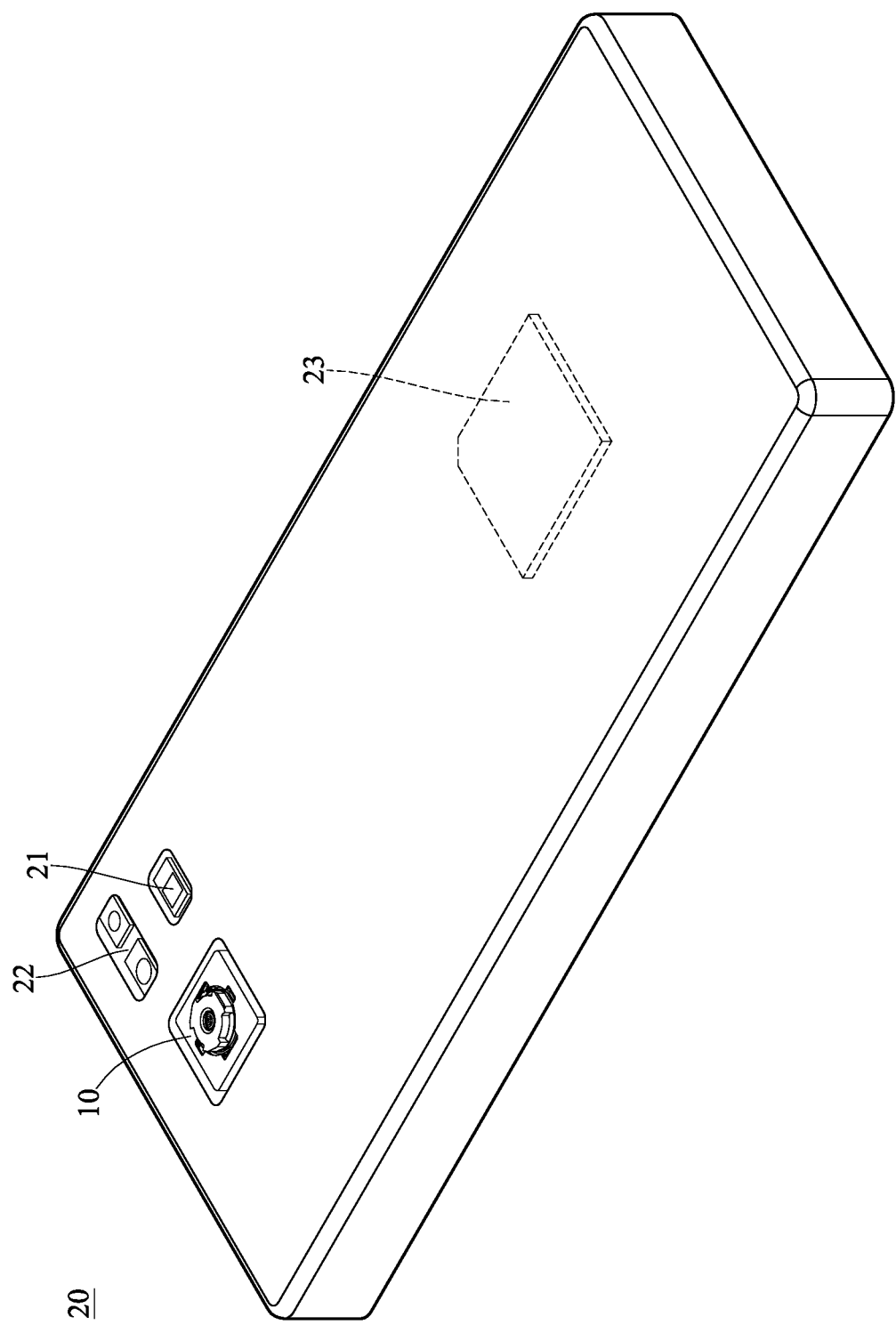
FIG. 20 is one perspective view of an electronic device according to the 11th embodiment of the present disclosure.
Figure 21:
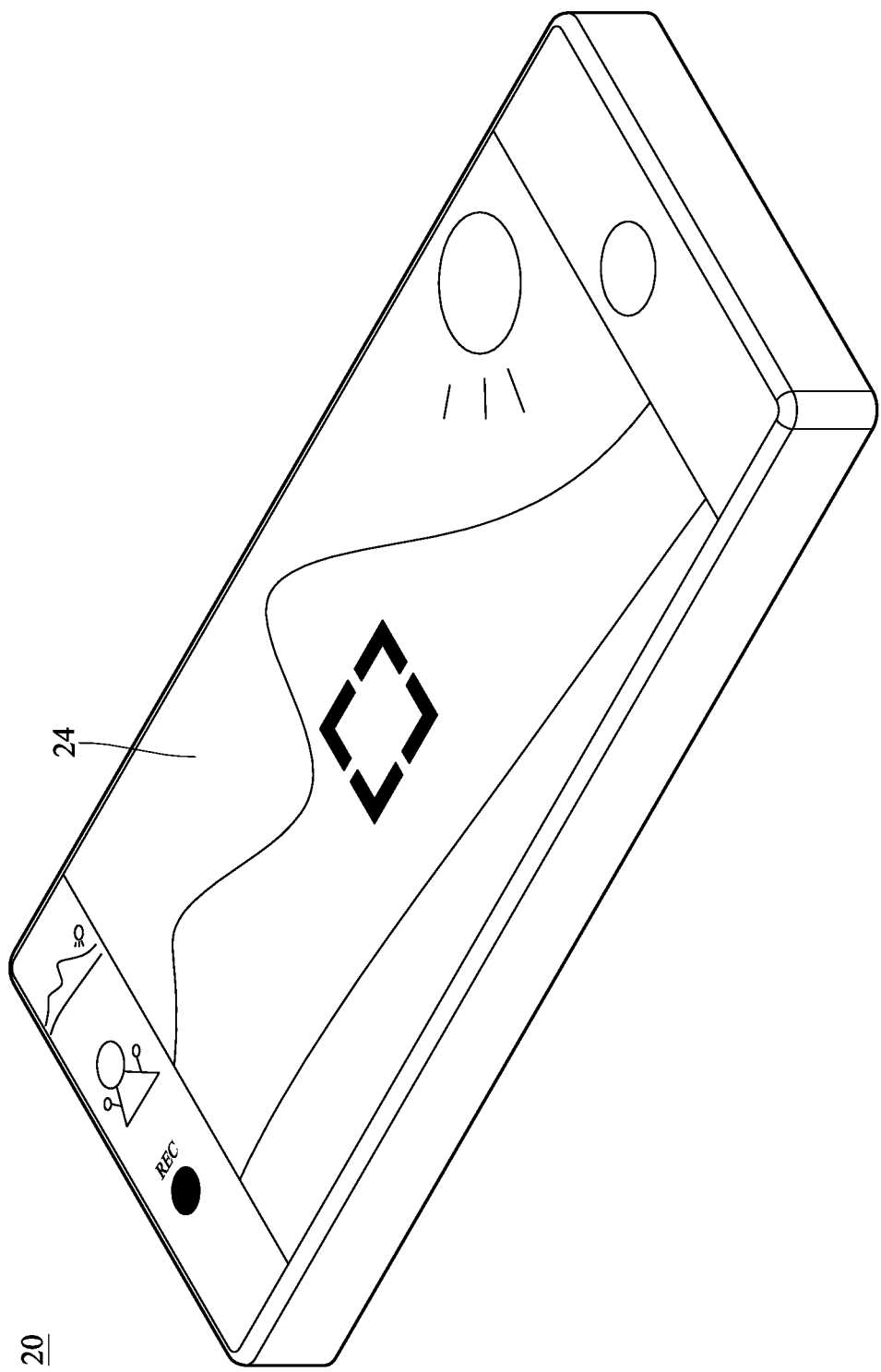
FIG. 21 is another perspective view of the electronic device in FIG. 20.
Figure 22:
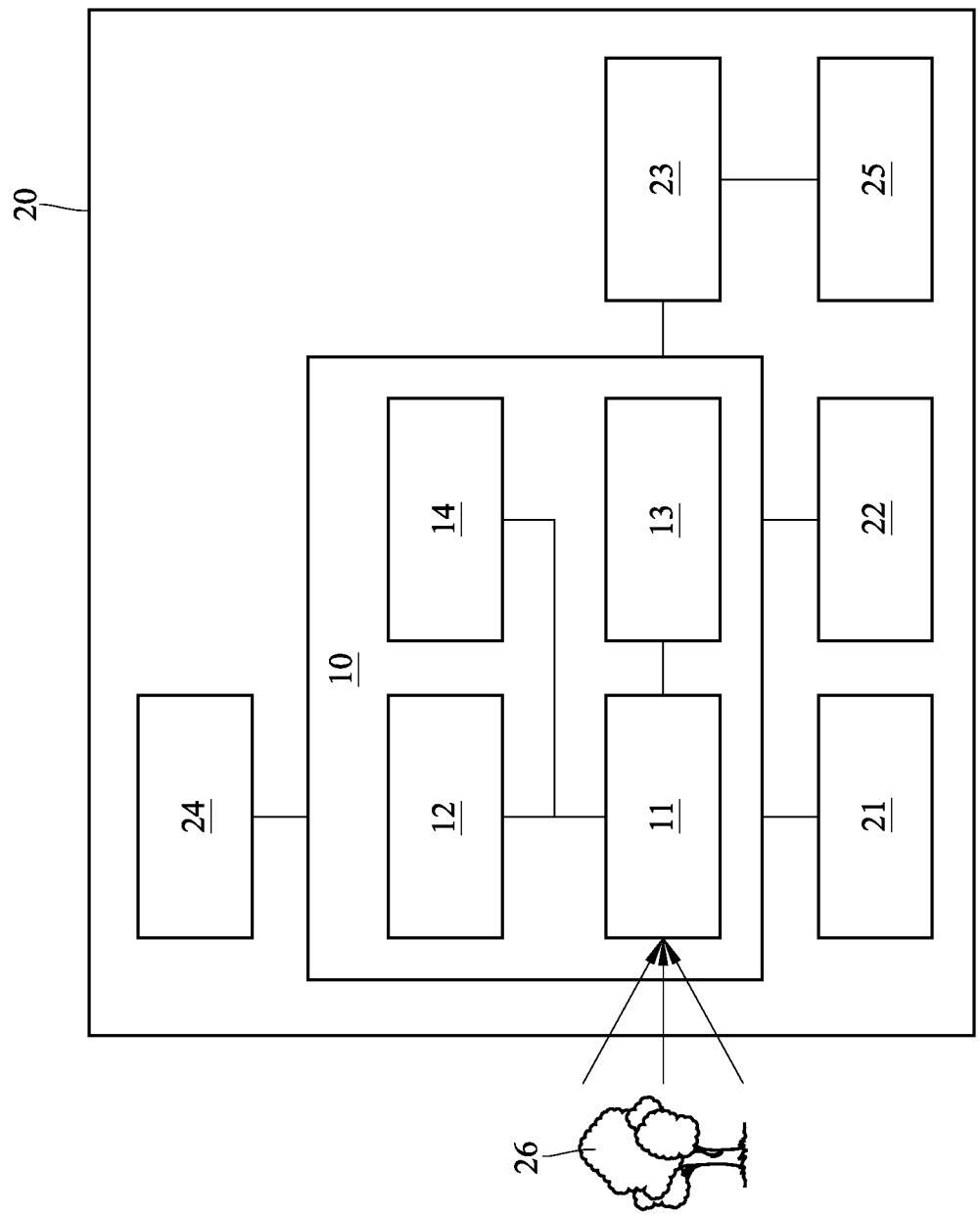
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20. In this embodiment, an electronic device 20 is a smart phone including the image capturing unit 10 disclosed in the 10th embodiment, a flash light module 21, a focus assist module 22, an image signal processor 23, an user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures the images of an object 26 through the user interface 24, the light rays converge in the image capturing unit 10 to generate images, and the flash light module 21 is activated for light supplement. The focus assist module 22 detects the object distance of the imaged object 26 to achieve fast auto focusing. The image signal processor 23 is configured to optimize the captured image to improve the image quality. The light beam emitted from focus assist module 22 can be either infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens assembly of the image capturing unit 10 is featured with good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, motion sensing input devices, multiple lens devices, wearable devices and other electronic imaging devices The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising six lens elements, the six lens elements being, in order from an object side to an image side: a first lens element, a second lens element, a third lens element, a fourth lens element, a fifth lens element and a sixth lens element;
   wherein each of the six lens elements has an object-side surface facing toward the object side and an image-side surface facing toward the image side;
   wherein the first lens element has negative refractive power, the second lens element has positive refractive power, the object-side surface of the fourth lens element is convex in a paraxial region thereof, at least one of the object-side surface and the image-side surface of the fourth lens element is aspheric, at least one of the object-side surface and the image-side surface of the fifth lens element is aspheric, the image-side surface of the sixth lens element is concave in a paraxial region thereof and has at least one inflection point, and each of the six lens elements is a single and non-cemented lens element;
   wherein an Abbe number of the third lens element is V3, an Abbe number of the fourth lens element is V4, an Abbe number of the fifth lens element is V5, and the following condition is satisfied:

$15.0<V3+V4+V5<96.0.$

2. The photographing optical lens assembly of claim 1, wherein the image-side surface of the third lens element is concave in a paraxial region thereof.

3. The photographing optical lens assembly of claim 2, wherein the object-side surface of the second lens element is convex in a paraxial region thereof, and the third lens element has negative refractive power.

4. The photographing optical lens assembly of claim 2, wherein an f-number of the photographing optical lens assembly is Fno, and the following condition is satisfied:

$1.20<Fno<2.20.$

5. The photographing optical lens assembly of claim 2, wherein the object-side surface of the sixth lens element is convex in a paraxial region thereof, a vertical distance between a critical point on the image-side surface of the sixth lens element and an optical axis is Yc62, a focal length of the photographing optical lens assembly is f, and the following condition is satisfied:

$0.10<Yc62/f<1.0.$

6. The photographing optical lens assembly of claim 1, wherein a focal length of the photographing optical lens assembly is f, a focal length of the sixth lens element is f6, and the following condition is satisfied:

$$-0.80<f/f6<0.20.$$

7. The photographing optical lens assembly of claim 6, wherein the image-side surface of the fourth lens element has at least one convex shape in an off-axis region thereof, the image-side surface of the fifth lens element has at least one convex shape in an off-axis region thereof, and the sixth lens element has negative refractive power.

8. The photographing optical lens assembly of claim 6, wherein a curvature radius of the object-side surface of the third lens element is R5, a curvature radius of the image-side surface of the third lens element is R6, and the following condition is satisfied:

$$0.80<(R5+R6)/(R5-R6)<3.40.$$

9. The photographing optical lens assembly of claim 1, wherein an axial distance between the object-side surface of the first lens element and an image surface is TL, a maximum image height of the photographing optical lens assembly is ImgH, and the following condition is satisfied:

$$TL/ImgH<2.0.$$

10. The photographing optical lens assembly of claim 9, wherein the image-side surface of the first lens element is concave in a paraxial region thereof, the image-side surface of the fifth lens element has at least one convex shape in an off-axis region thereof, and the object-side surface of the sixth lens element is convex in a paraxial region thereof.

11. The photographing optical lens assembly of claim 9, wherein a focal length of the photographing optical lens assembly is f, a curvature radius of the image-side surface of the fifth lens element is R10, and the following condition is satisfied:

$$-0.20<f/R10<0.80.$$

12. The photographing optical lens assembly of claim 9, wherein a curvature radius of the object-side surface of the fifth lens element is R9, a curvature radius of the object-side surface of the sixth lens element is R11, and the following condition is satisfied:

$$-0.40<R11/R9<0.35.$$

13. A photographing optical lens assembly comprising six lens elements, the six lens elements being, in order from an object side to an image side: a first lens element, a second lens element, a third lens element, a fourth lens element, a fifth lens element and a sixth lens element;
wherein each of the six lens elements has an object-side surface facing toward the object side and an image-side surface facing toward the image side;
wherein the first lens element has negative refractive power, the second lens element has positive refractive power, at least one of the object-side surface and the image-side surface of the fourth lens element is aspheric, at least one of the object-side surface and the image-side surface of the fifth lens element is aspheric, the object-side surface of the sixth lens element is convex in a paraxial region thereof, the image-side surface of the sixth lens element is concave in a paraxial region thereof and has at least one inflection point, each of the six lens elements is a single and non-cemented lens element, and the photographing optical lens assembly further comprises an aperture stop disposed between the first lens element and the second lens element;
wherein an Abbe number of the third lens element is V3, an Abbe number of the fourth lens element is V4, an Abbe number of the fifth lens element is V5, and the following condition is satisfied:

$$15.0<V3+V4+V5<96.0.$$

14. The photographing optical lens assembly of claim 13, wherein the image-side surface of the third lens element is concave in a paraxial region thereof.

15. The photographing optical lens assembly of claim 14, wherein the object-side surface of the second lens element is convex in a paraxial region thereof, and the image-side surface of the second lens element is convex in a paraxial region thereof.

16. The photographing optical lens assembly of claim 14, wherein a curvature radius of the object-side surface of the third lens element is R5, a curvature radius of the image-side surface of the third lens element is R6, and the following condition is satisfied:

$$0.80<(R5+R6)/(R5-R6)<3.40.$$

17. The photographing optical lens assembly of claim 14, wherein a curvature radius of the object-side surface of the fifth lens element is R9, a curvature radius of the object-side surface of the sixth lens element is R11, and the following condition is satisfied:

$$-1.0<R11/R9<0.55.$$

18. The photographing optical lens assembly of claim 13, wherein a focal length of the photographing optical lens assembly is f, a focal length of the sixth lens element is f6, and the following condition is satisfied:

$$-0.80<f/f6<0.20.$$

19. The photographing optical lens assembly of claim 18, wherein the image-side surface of the first lens element is concave in a paraxial region thereof, the third lens element has negative refractive power, and the image-side surface of the third lens element is concave in a paraxial region thereof.

20. The photographing optical lens assembly of claim 18, wherein the image-side surface of the fifth lens element has at least one convex shape in an off-axis region thereof, a vertical distance between a critical point on the image-side surface of the sixth lens element and an optical axis is Yc62, the focal length of the photographing optical lens assembly is f, and the following condition is satisfied:

$$0.10<Yc62/f<1.0.$$

21. The photographing optical lens assembly of claim 13, wherein an axial distance between the object-side surface of the first lens element and an image surface is TL, a maximum image height of the photographing optical lens assembly is ImgH, and the following condition is satisfied:

$$TL/ImgH<2.0.$$

22. The photographing optical lens assembly of claim 21, wherein the image-side surface of the fifth lens element has at least one convex shape in an off-axis region thereof.

23. The photographing optical lens assembly of claim 21, wherein an f-number of the photographing optical lens assembly is Fno, and the following condition is satisfied:

$$1.20<Fno<2.20.$$

24. The photographing optical lens assembly of claim 21, wherein a focal length of the photographing optical lens assembly is f, a curvature radius of the image-side surface of the fifth lens element is R10, and the following condition is satisfied:

$$0 \leq f/R10.$$

25. The photographing optical lens assembly of claim 21, wherein a central thickness of the fourth lens element is larger than a central thickness of the fifth lens element.

26. An image capturing unit, comprising:
the photographing optical lens assembly of claim 13;
a driving device; and
an image sensor disposed on an image surface of the photographing optical lens assembly.

27. An electronic device, comprising:
the image capturing unit of claim 26.

* * * * *